US007007275B1

(12) United States Patent
Hanson et al.

(10) Patent No.: US 7,007,275 B1
(45) Date of Patent: Feb. 28, 2006

(54) METHOD AND APPARATUS FOR AUTOMATIC EXECUTION OF CONCATENATED METHODS ACROSS MULTIPLE HETEROGENEOUS DATA SOURCES

(75) Inventors: Charles Albin Hanson, Shoreview, MN (US); Thomas Winston Johnson, Stillwater, MN (US); Carol Jean O'Hara, Prior Lake, MN (US); Koon-yui Poon, Lynnwood, WA (US); Roger Anthony Redding, Bellevue, WA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/422,775

(22) Filed: Oct. 21, 1999

(51) Int. Cl.
G06F 9/46 (2006.01)
(52) U.S. Cl. .................. 718/101; 709/201; 709/202; 719/317; 710/3
(58) Field of Classification Search ............... 717/115; 707/10, 102, 4, 100; 709/100, 101, 203, 709/201, 202; 718/101; 719/317; 710/3
See application file for complete search history.

(56) References Cited

U.S. PATENT DOCUMENTS

| 5,544,320 | A | * | 8/1996 | Konrad .................. 709/203 |
| 5,557,785 | A | * | 9/1996 | Lacquit et al. ........... 707/104.1 |
| 5,590,319 | A | * | 12/1996 | Cohen et al. .............. 707/4 |
| 5,596,744 | A | * | 1/1997 | Dao et al. .................. 707/10 |
| 5,634,051 | A | * | 5/1997 | Thomson .................. 707/5 |
| 5,634,053 | A | * | 5/1997 | Noble et al. .............. 707/4 |
| 5,664,182 | A | * | 9/1997 | Nierenberg et al. ......... 707/102 |
| 5,749,079 | A | * | 5/1998 | Yong et al. ................ 707/100 |
| 5,835,757 | A | * | 11/1998 | Oulid-Aissa et al. ......... 707/10 |
| 5,884,312 | A | * | 3/1999 | Dustan et al. .............. 707/10 |
| 5,899,990 | A | * | 5/1999 | Maritzen et al. ............ 707/4 |
| 5,913,214 | A | * | 6/1999 | Madnick et al. ............ 707/10 |
| 5,970,500 | A | * | 10/1999 | Sabatini et al. .......... 707/104.1 |
| 6,012,053 | A | * | 1/2000 | Pant et al. ................ 707/3 |
| 6,108,646 | A | * | 8/2000 | Mohri et al. .............. 707/1 |
| 6,108,651 | A | * | 8/2000 | Guha ...................... 707/4 |
| 6,185,558 | B1 | * | 2/2001 | Bowman et al. ............ 707/5 |
| 6,249,282 | B1 | * | 6/2001 | Sutcliffe et al. .......... 345/751 |
| 6,314,501 | B1 | * | 11/2001 | Gulick et al. ............. 711/153 |
| 6,321,228 | B1 | * | 11/2001 | Crandall et al. ........... 707/10 |
| 6,360,205 | B1 | * | 3/2002 | Iyengar et al. ............ 705/5 |
| 6,434,546 | B1 | * | 8/2002 | Williamowski et al. ....... 707/3 |

(Continued)

*Primary Examiner*—Meng-Al T. An
*Assistant Examiner*—Lilian Vo
(74) *Attorney, Agent, or Firm*—Nathan Cass; Mark T. Starr; Lise A. Rode

(57) ABSTRACT

Heterogeneous data at a plurality of remote nodes is accessed automatically in parallel at high speed from a user site using a simple script request containing a data source object name wherein the heterogeneous data is treated as a single data source object, the script further containing at least one method to be performed on the data source object and at least a second method to be automatically performed on the results of executing the first method. A user site agent breaks the user-generated script into new scripts appropriate for execution at the remote nodes and determines whether the second method should be executed at the remote nodes or at the user site. A messenger process transmits the new scripts to the appropriate remote nodes where respective agent processes respond to automatically access the appropriate data and to automatically execute the specified methods.

17 Claims, 18 Drawing Sheets

U.S. PATENT DOCUMENTS

| | | | |
|---|---|---|---|
| 6,438,578 B1 * | 8/2002 | Schmid et al. | 709/203 |
| 2001/0010059 A1 * | 7/2001 | Burman et al. | 709/224 |
| 2002/0026443 A1 * | 2/2002 | Chang et al. | 707/10 |
| 2002/0073206 A1 * | 6/2002 | Jawahar et al. | 709/227 |
| 2002/0178161 A1 * | 11/2002 | Brezin et al. | 707/10 |
| 2003/0004931 A1 * | 1/2003 | Soetarman et al. | 707/3 |

* cited by examiner

FILE  EDIT  CUSTOMIZE  IMPORT  GENERATE  LAYOUT  HELP

GUI  DATA FLOW  COMPUTATION  MULTIMEDIA  INTERNET  DATABASE  DEBUG  USER

```
#IMPORT CLIENT
PRIVATE STRING BUF;
MAIN( ) {
  WHILE (TRUE) {
    CLIENT.NEPTUNE (OBJECTS( ));      // OUTPUT ALL DATA OBJECT NAMES
    CLIENT.STATUS ("SELECT A DATA OBJECT");   // ADVISE USER TO SELECT DATA OBJECT
    CLIENT.READ(BUF);                 // READ NAME OF DATA OBJECT
    #IMPORT *BUF                      // IMPORT DATA OBJECT INFORMATION
    CLIENT.URANUS (*BUF.METHODS( ));  // OUTPUT METHODS OF DATA OBJECT
    CLIENT.PLUTO (*BUF.COLUMNS ( ));  // OUTPUT COLUMNS OF DATA OBJECT
  } //WHILE
} //MAIN
```

FIG. 10A

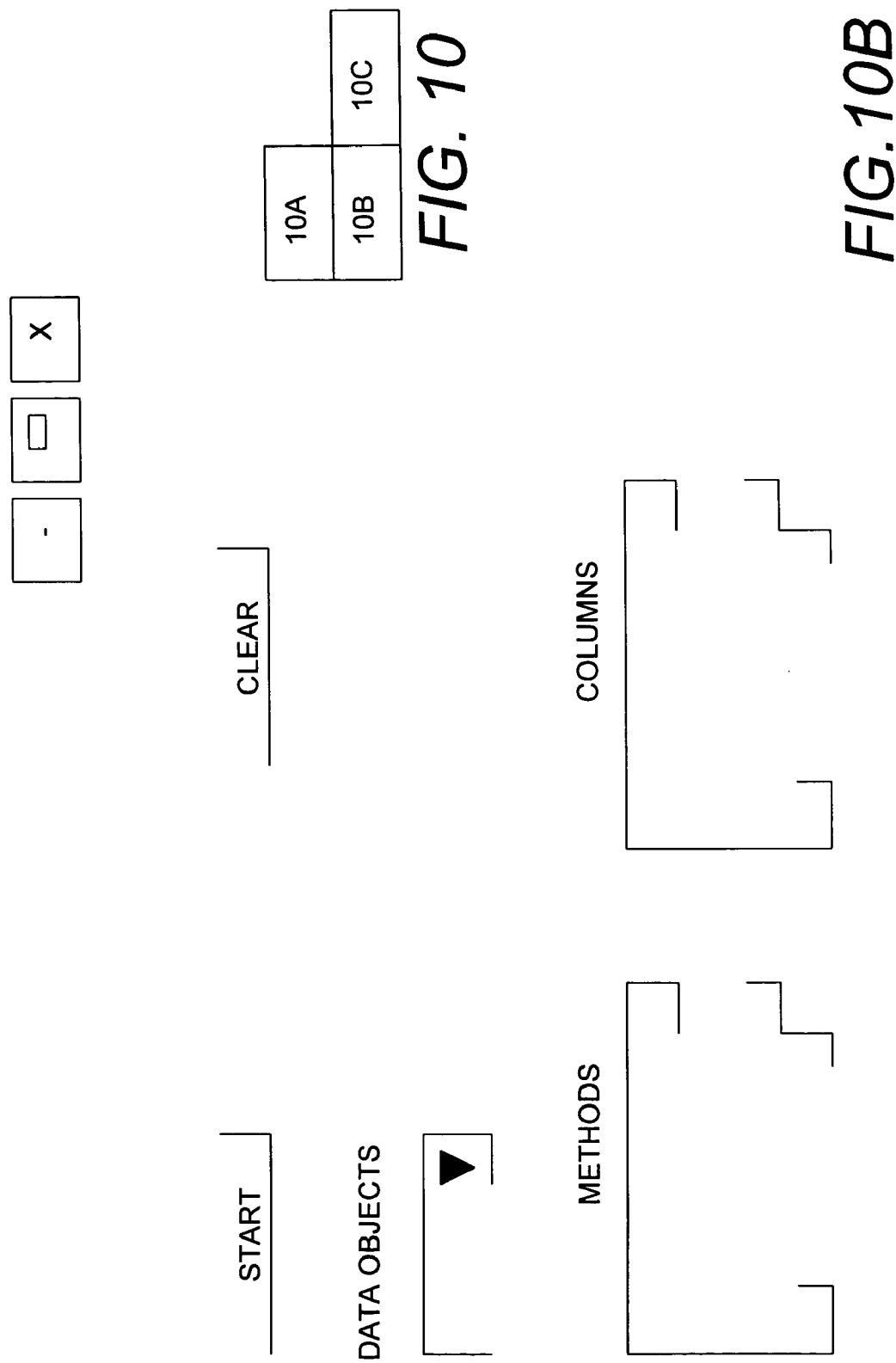

FILE EDIT CUSTOMIZE IMPORT GENERATE LAYOUT HELP

DATA FLOW COMPUTATION MULTIMEDIA INTERNET DATABASE DEBUG USER

```
#IMPORT  CLIENT
#IMPORT  PERSONNEL
PRIVATE  CHAR [ ] BUF;
MAIN ( ) {
   CLIENT.READ (BUF);                                                    // READ BIRTHDATE FROM USER
   PERSONNEL.SEARCH (IF BIRTHDATE == BUF));                              // SEARCH FOR BIRTHDAYS EQUAL
   THIS.FORMAT ("%S, "%S, "%S, "%S, "%S, "%S, LASTNAME, FIRSTNAME, ADDRESS, CITY, STATE, SSN, PHONE);
   CLIENT.WRITE (THIS);                                                  // OUTPUT DATA TO CLIENT
   // MAIN
}
```

FIG. 11A

ENTER BIRTHDATE

LAST NAME

FIRST NAME

ADDRESS

CITY

STATE

SSN

PHONE

NEXT

| 11A | |
|---|---|
| 11B | 11C | 11D |

METHOD AND APPARATUS FOR AUTOMATIC EXECUTION OF CONCATENATED METHODS ACROSS MULTIPLE HETEROGENEOUS DATA SOURCES

COPYRIGHT MASK WORK

37 CFR 1.71 (d)(e)

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The subject invention relates generally to data processing and more particularly to a method and apparatus providing high speed parallel accessing of data stored at a number of remote heterogeneous sites and automatic, pipelined execution of successive methods on such data.

BACKGROUND OF THE INVENTION AND RELATED ART

Present technology is witnessing the development of large remote databases or "data warehouses", as well as rapid expansion of the Internet and proliferation of corporate intranets. Demand is growing for increasingly large and rapid data transfers involving streaming video, visualization graphics and large data warehouse downloads over such new network protocols as the Fast Ethernet and Gigabyte Ethernet. The data which it would be desirable to access may be stored across heterogeneous sites, i.e., sites which contain different types of database systems or other data containers. Hence the data which may need to be accessed may be referred to as "heterogeneous data.".

At the same time as demand has grown for large and rapid data transfers, there has been constant pressure to simplify the user interface to a vast array of components and data storage facilities. While individual components in a particular solution are often easy to use, combining them in a complete solution still presents extremely complex problems to the user.

In addition to simplifying the user interface to heterogeneous data and complex arrays of components, it appears desirable to provide the user with added capabilities to readily command and perform more powerful automated data processing operations, in addition to simple "search" queries.

SUMMARY OF THE INVENTION

Our co-pending application, U.S. Ser. No. 09/405,038 entitled Method Apparatus For High Speed Parallel Accessing And Execution of Methods Across Multiple Heterogeneous Data Sources provides the capability to access distributed data contained in a number of distributed heterogeneous data sources via a search initiated by a single JAVA Script wherein a single object represents the data to be retrieved and subjected to a method in the Script. According to the subject invention, successive methods set out in a script are executed automatically across distributed data, with the results of one execution automatically piped to the next method. An example is the search of a data object followed by an automatic sort of the results of the search, followed by the e-mail of the results of the sort, wherein the data to be searched is distributed across a plurality of nodes, each node having a different type of database.

The invention finds one application in a system employing metadata-based high level abstraction of a federation of clustered or distributed heterogeneous databases and/or data files in which the federation of databases is referenced or treated as a single object, as well as in an apparatus for parallel data access and concurrent execution of object methods across the distributed data. The single object is referenced hereafter as the "data source object," sometimes abbreviated to simply "data object."

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

Figure 11C:
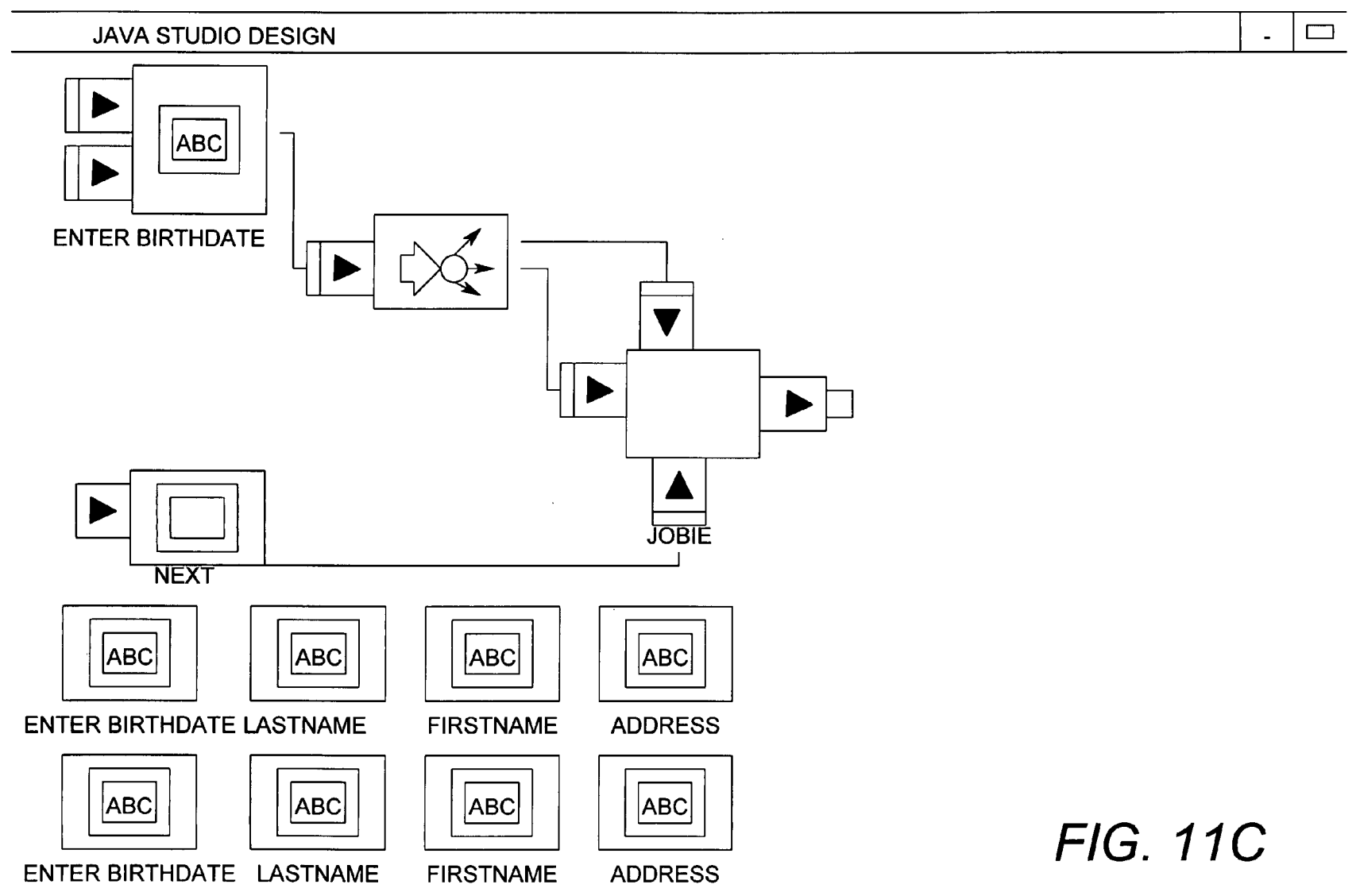

FIGS. 10A–C and 11A–D illustrate respective Java Studio design panels adapted to form part of an alternate embodiment.

DETAILED DESCRIPTION OF ONE EMBODIMENT

Figure 1:
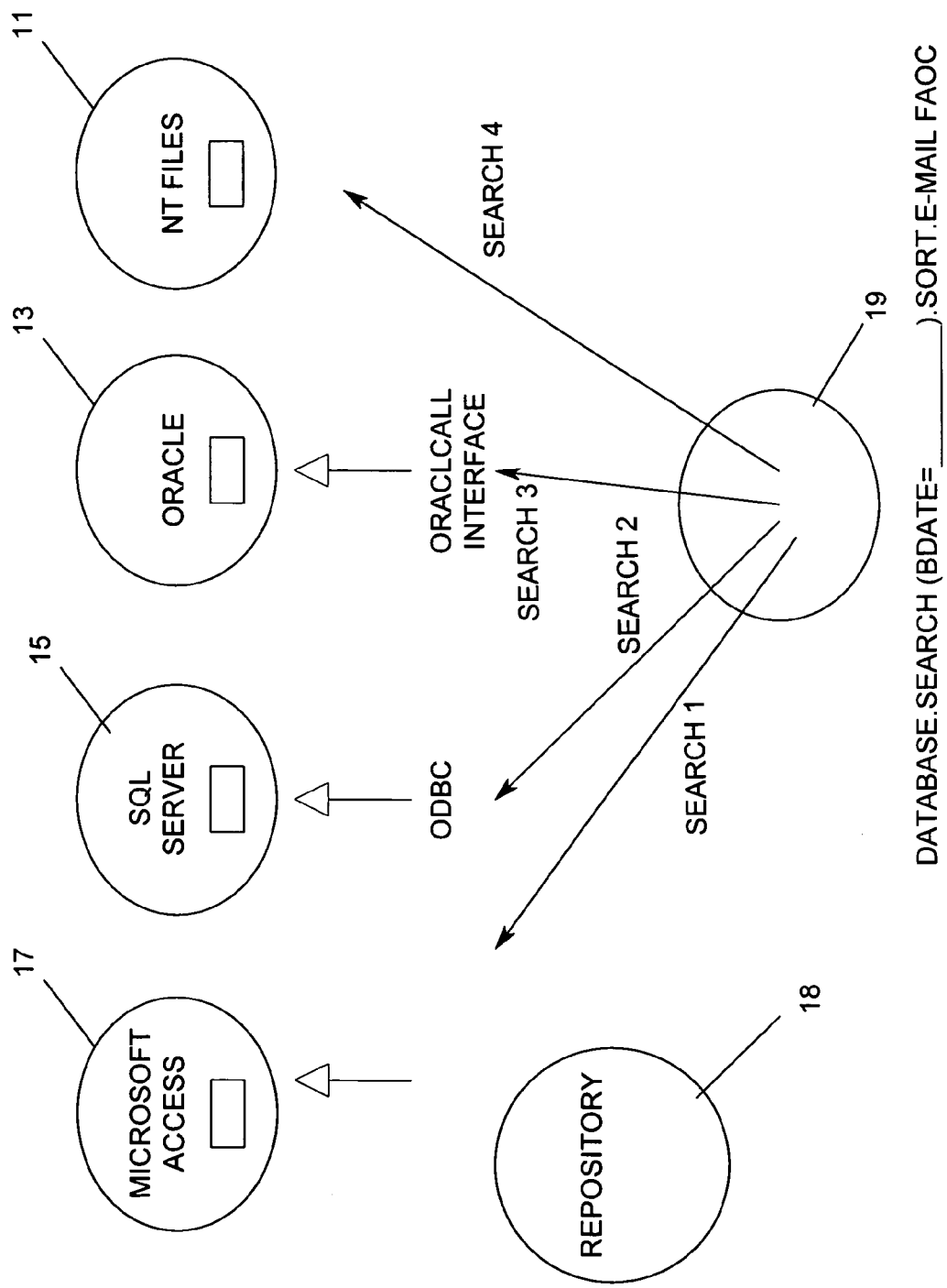
FIG. 1 is a system block diagram illustrating a method and apparatus according to the preferred embodiment of the invention.

FIG. 1 illustrates a plurality of remote sites or nodes 11, 13, 15, 17 wherein data to be retrieved or accessed is typically spread across the respective nodes. In the illustrative example of FIG. 1, the data at node 11 comprises Microsoft NT files, the data at node 13 comprises an Oracle database, the data at node 15 comprises an SQL Server database, and the data at node 17 comprises a Microsoft Access database.

In one example of operation of the system of FIG. 1, a user at user site or node 19 propounds a simple request which automatically sets in motion concurrent parallel accessing of all the remote databases 11, 13, 15, 17. The request illustrated in FIG. 1 is a search request and the parallel searches are referenced respectively as Search 1, Search 2, Search 3 and Search 4. The searches provide parallel access to the heterogeneous data using a metadata approach and treating the heterogeneous data as if it were a single object. The simple query or request is first interpreted so as to pass the relevant part of the script from a user node across to the remote nodes. In the embodiment under discussion, queries or requests are presented as JAVA scripts.

Each of the searches is optimized with respect to the underlying data. For example, there are number of ways of accessing the Oracle database, such as via an OBDC connection or via the Oracle Call Interface. According to the preferred embodiment, the method used to access the Oracle database is via the Oracle Call Interface. This method is optimum for the purpose of the preferred embodiment because it provides the shortest path length to the data. Thus, standard database interfaces are used, while selecting the one which provides the shortest path length. The user writing the query statement is unaware of the approach used to actually access the data.

The metadata describes the contents of the data object of a request (query). The metadata is contained in a repository 18, using data object models which describe the overall federation of servers and data sources. In the preferred embodiment, there are four categories of data source objects:

Distributed over the nodes of a cluster

Distributed over a network

Distributed over an SMP (symmetric multiprocessor)

Not distributed

A distributed network can be an Ethernet or nodes on a cluster or a gigabit/sec connection.

A repository application generates a set of data source descriptor files automatically from the metadata at run-time. The data descriptor files contain only the metadata corresponding to the data source object contained in the user-written script.

The descriptor files are held locally in NT flat files, and are used at run-time in the interpretation of the query requests. The use of optimized local files further supports high run-time performance. The repository used according to the preferred embodiment is the Unisys Repository (UREP). Various other repositories could be used such as Microsoft's or a standard one such as is being developed by the Object Management Group.

The descriptor file name is also used as the name of the data object in the query scripts, which data object represents the highest level of abstraction of the federation of data in question. For example, the descriptor file corresponding to an object, cluster population, would be called "cluster population." A user might write a query, for example:

cluster.population.search (if (bdate=xx/xx/xx)), searching the population (perhaps the population of the United States) for all persons with a particular birthdate. As discussed in ore detail below, an "agent" interpreting this script will refer to the local descriptor file, cluster.population, to determine the nature of the object.

In the case of FIG. 1, the metadata indicates that the data is contained in the SQL Server, Oracle and/or NT files databases 11, 13, 15 and sets forth the organization of all the data in the respective databases, e.g. the columns and rows and how to interpret the data stored in the database. Accordingly, the user at site 19 does not need to know the data structure and is thus writing applications at a transparent level, i.e., treating the whole network as a single object and writing methods on it.

A special interpreter or "agent" process is employed at the local or user site, which interprets the script/request and "looks up" the appropriate metadata from the NT descriptor file. The local agent then sends appropriate scripts to the particular nodes which contain data corresponding to the data object. An agent (interpreter) module located at each remote node interprets and executes received scripts.

Each agent comprises a module of code (an NT process or the equivalent in another operating system). Thus, two levels of interpretation are employed, a first to interpret the script and a second to interpret and execute the interpreted script at the appropriate nodes. As much processing as possible is performed close to the data, i.e., at the physical sites where the data is stored, in order to minimize message traffic between user and nodes. Thus, a function shipping model is used.

According to the example being discussed in connection with FIG. 1, the agent at each remote site, 11, 13, 15, 17 receives the interpreted client request, which includes a data source object name and the methods to be applied, which were originally embedded in the script generated by the user. The remote agent determines from the data source object (1) whether the data is distributed, and if so, (2) the way in which it is distributed. These details (1) and (2) are contained in the repository 18 of metadata. Once armed with items (1) and (2), the remote agent performs the required method(s) upon the data.

Figure 2:
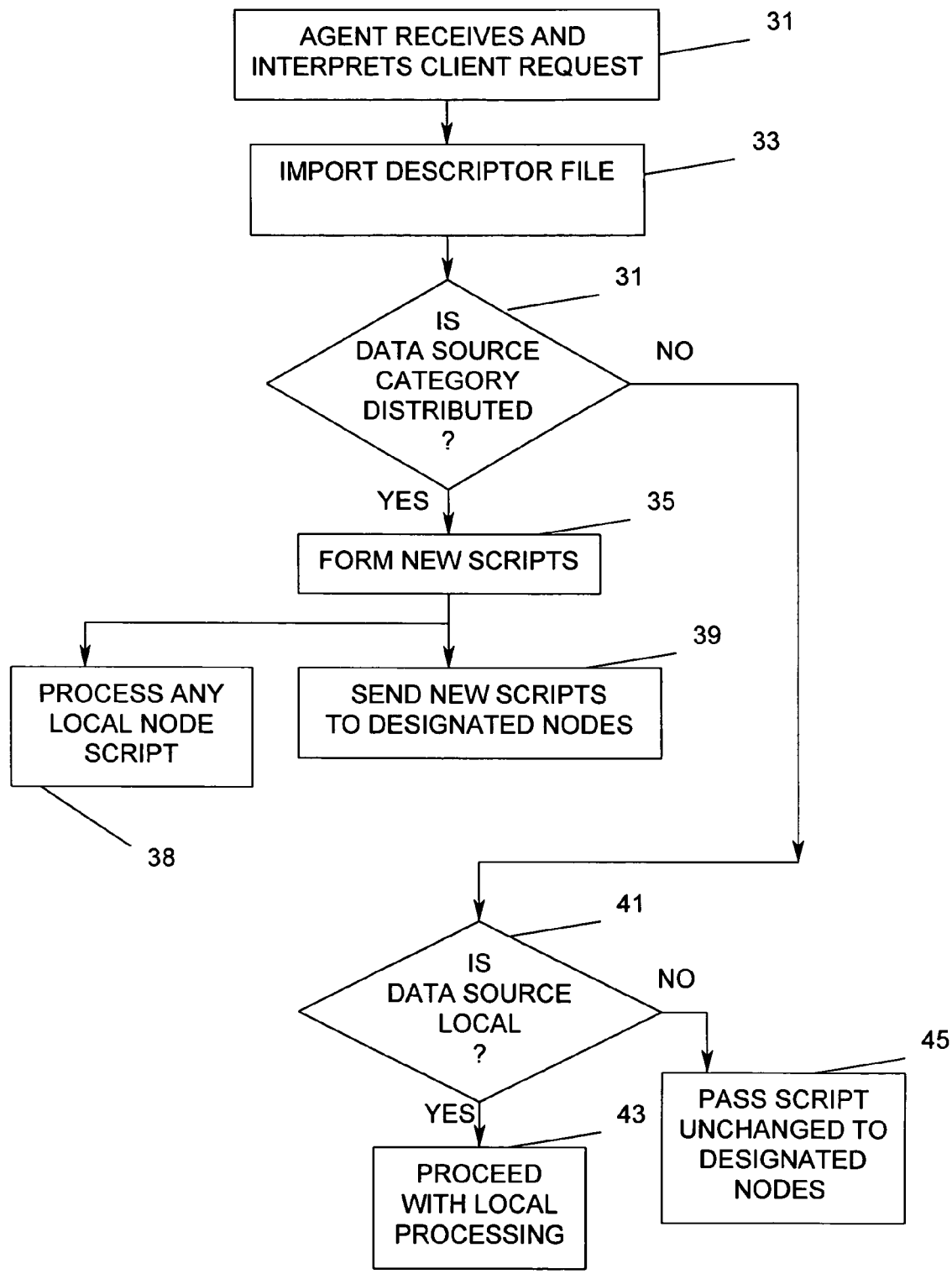
FIG. 2 is a flow diagram illustrating structure and operation of an agent process according to the preferred embodiment.

The first level (local) interpretation of the two level interpretation process will now be further detailed in conjunction with FIG. 2 and an illustrative example of operation according to the preferred embodiment of the invention. This example considers the client request as being received by an agent at the user site 19, although the request could be received by an agent at a remote site.

According to step 31 of FIG. 2, an agent at the user site 19 first receives the client request, which, in the preferred embodiment is in the form of a Java script. The agent at the user site 19 then interprets the script. The data source object name (e.g., C_sq1_data) is embedded in the script, as are the methods to be invoked on the referenced data source (e.g., "sort" in C_sq1_data.sort(state(d))).

The data source object is categorized by whether it is distributed, and the way in which it is distributed. The category of the data source object is specified in the data source descriptor file. As noted above, the latter is a text file with the same name as the data source object itself, i.e., C_sq1_data.

At the beginning of the local interpretation of the script, the local agent imports the descriptor file, step 33 of FIG. 2. In step 35, the local agent examines the descriptor file and determines the next processing step, depending on the category of the referenced data source object.

If, in step 35, the data source category is determined to be "distributed," the agent proceeds to step 37 and breaks the script into new scripts appropriate to the designated nodes. The new scripts are then sent to the designated nodes for further concurrent processing, step 38, 39 of FIG. 2. The agent on the processing node checks the data source type to determine the next processing step (there are three data source types: NT file system, SQL Server, Oracle)—and then proceeds with the processing.

If, in step 35, the local agent determines that the data source is non-distributed, the agent proceeds to the test 41 to check to see if the data source location is local or not. If not local, the agent passes the script unchanged to the designated node, step 45, if local, the agent checks the data source type for next processing step and proceeds with processing, step 45.

The following code provides an example of local interpretation of the user script, C_sq1_data.sort(state(d)), presented at node 1 of a cluster:

```
#import C_sql_data
main ( ) {
        :
    C_sql_data.search(if (b_date == xx/xx/xx))
        :
Descriptor file C_sql_data resembles:
    SERVER = 1(sql_data), 3 (sql_data), 5 (nt_data)
    }
Descriptor file sql_data resembles:
    SERVER = 1; MS; sql_data = publish:authors;
    {
        au_id*      unique       CHARACTER(11)
            :
        State*      null         CHARACTER(2)
            :
    }
}
```

According to this example, a data source object, C_sq1_data, is searched for persons with a particular birthdate. A data source descriptor file, with the same name as the data source object, indicates that C_sq1_data is distributed across Nodes servers 1, 3, 5 of a cluster. Descriptor files on each node give details of the data distributed on that node (in this case, the data is in SQL Server databases on servers 1 and 3, and in an NT file system on server 5).

The agent on local server 1 begins execution of the script by importing the data source descriptor file, C_sq1_data. The category of the data is "cluster," the hosting server is "1" with the data distributed on servers 1, 3 and 5. The agent processes the statement. In due course, the agent will check the syntax and verify, for example, that "b_date" is specified as a column in the descriptor of the sq1_data object.

In processing the statement, the agent breaks the script into

```
sql_data.search( )      for server 1;
sql_data.search( )      for server 2;
nt_data.search( )       for server 5
```

The agent on server 1 processes the first statement; the second statement is sent to server 3; and the third statement is sent to server 5. There is an object with a descriptor file name, sq1_data, on server 3 and an object with a descriptor file name nt_data on server 5. After the processing (sorting) at each node, the information is returned to the original (coordinating) agent for final processing.

By using a function shipping model, in which the search commands are sent to be executed as close to the data as possible, and only the results ("hits") are returned to the requester, the network traffic is minimized (compared with a data shipping model, in which all the data might be sent to the requester, and the search performed there). In the event that updates are involved, the approach also ensures that there will never be a later update in another server's cache, thus maintaining cache coherency across servers.

Figure 3:
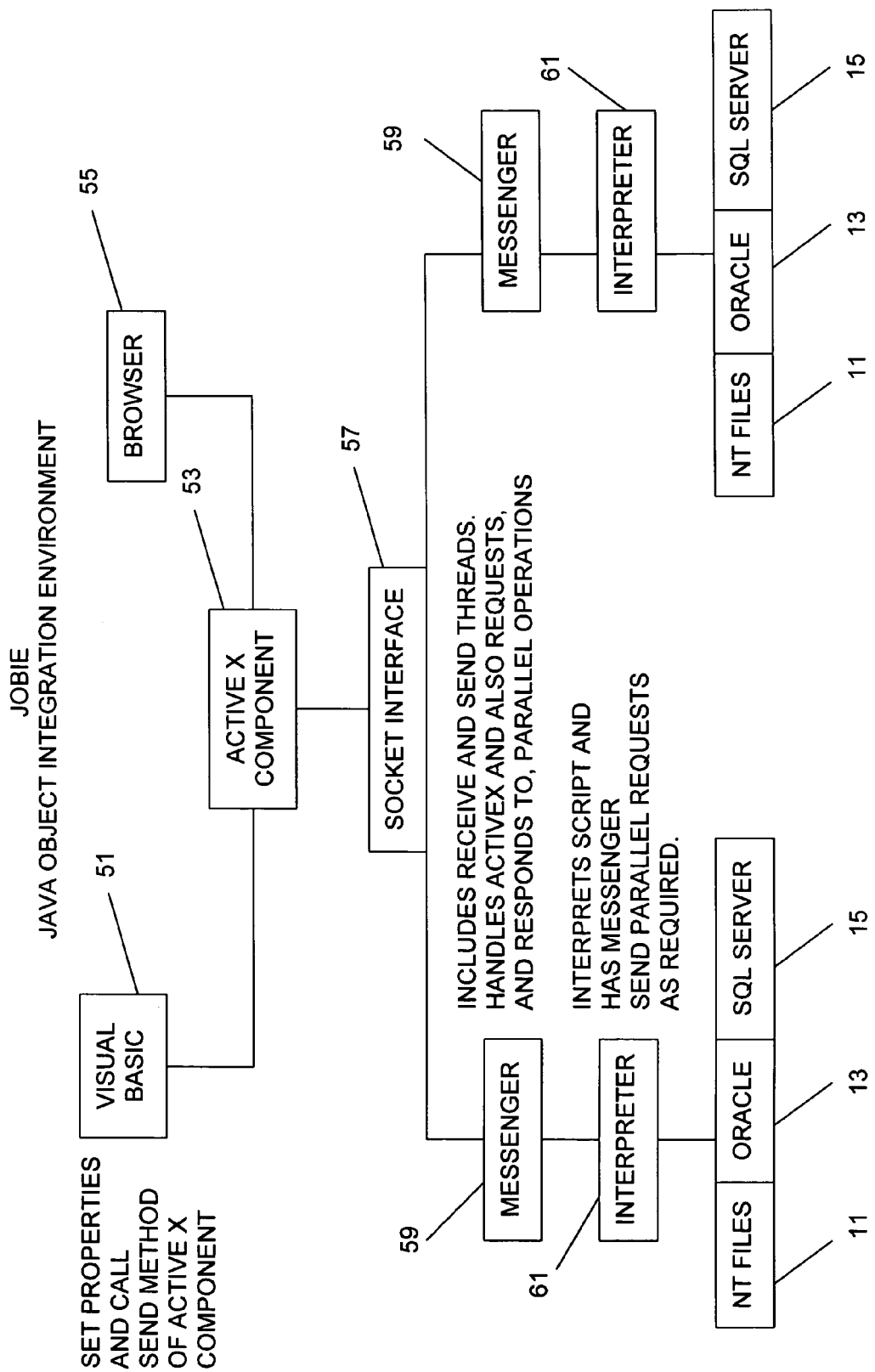
FIG. 3 is a block diagram illustrating system architecture according to the preferred embodiment.

FIG. 3 provides an illustrative system architecture. According to FIG. 3, a Visual Basic client 51, a browser 55, or an Active Server Page, interfaces to an ActiveX component 53. The client sets information to describe its request (e.g., the name of a file containing a script to be executed) in a table within the ActiveX component 53 and calls a "send" method within the component. The ActiveX component 53 interfaces with a Messenger code module 59 via a Sockets interface. In this way, the apparatus appears to the client to be an ActiveX component.

The "messenger" 59 listens for messages from the Sockets interface 57, and its operation is illustrated in connection with FIG. 4. This module of code contains two key NT or Unix threads (or the equivalent for other operating systems): a send thread and a receive thread. The receive thread listens for new messages from a client or from an agent. The send thread returns results to the client, or sends requests to another server.

Figure 4:
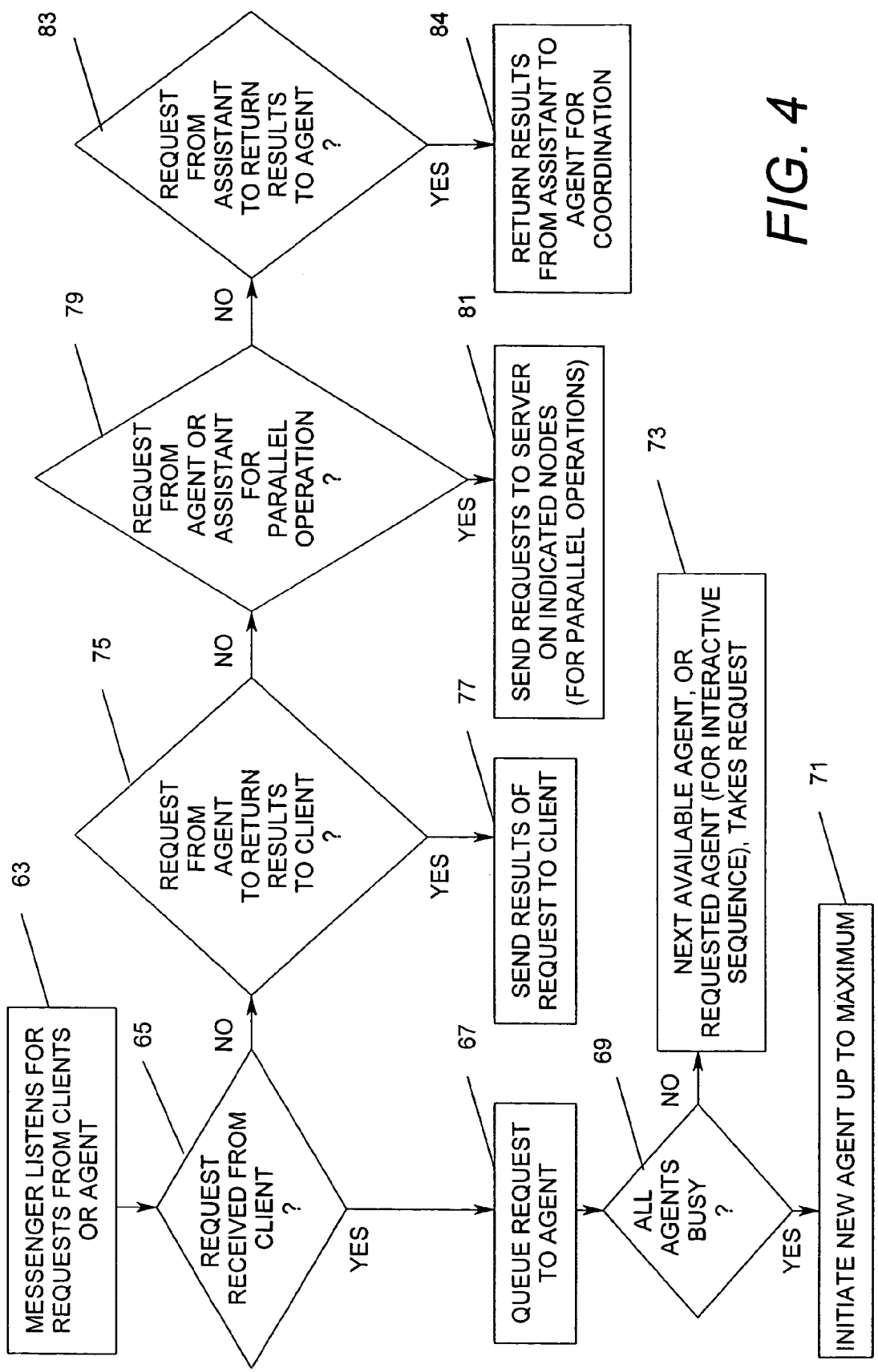
FIG. 4 is a flow diagram illustrating a messenger process according to the preferred embodiment.

As indicated by steps 63, 65, 67 of FIG. 4, on receiving a message from the Sockets interface 57, the messenger 59 queues the request for interpretation by an "agent" process 61, which analyzes the message and performs the request. If, on receipt of a message, the messenger 59 detects that all agent processes are busy at test 69, additional agents may be created, step 71, up to a maximum, using standard NT or Unix or equivalent operating system process initiation calls. If all agents are not busy, the next available agent process will interpret the request, as indicated by step 73.

On detecting that the data is distributed, the agent breaks the script into the appropriate scripts for each data source as discussed above and queues a request to the "messenger" process to send these scripts to the respective distributed servers to be processed in parallel. Thus, if successive "NO's" occur at tests 65 and 75 of FIG. 4, and a "YES" results at test 79, parallel requests are sent out. The receiving "messenger" process at the destination server queues the request to an "assistant agent" (which differs from an "agent" only in that it is always invoked from, and replies to, another "agent," rather than to an external client). The assistant agent interprets the script (for example, a "search" of local data), queuing the results and presenting a request to the local "messenger" for return to the requesting agent.

Thus, when test 83 of FIG. 4 is satisfied, results are returned to the local messenger in step 84 where the results are then consolidated. The agent may then request the messenger to return results to the client, test 75, step 77. In this way, automatic execution of methods is achieved across distributed heterogeneous data (in NT files, SQL server, Oracle, . . . ) transparently to the requester without the writer of the request (script) having to be aware of where the data is located, how it is accessed, where the methods execute or how they were created. If the data is distributed, the execution runs automatically in parallel. With implementation of the agent and messenger models on different operating systems, the servers may run on a heterogeneous mix of NT, Unix, 2200, A-Series, IBM, . . . etc.

Figure 5A:
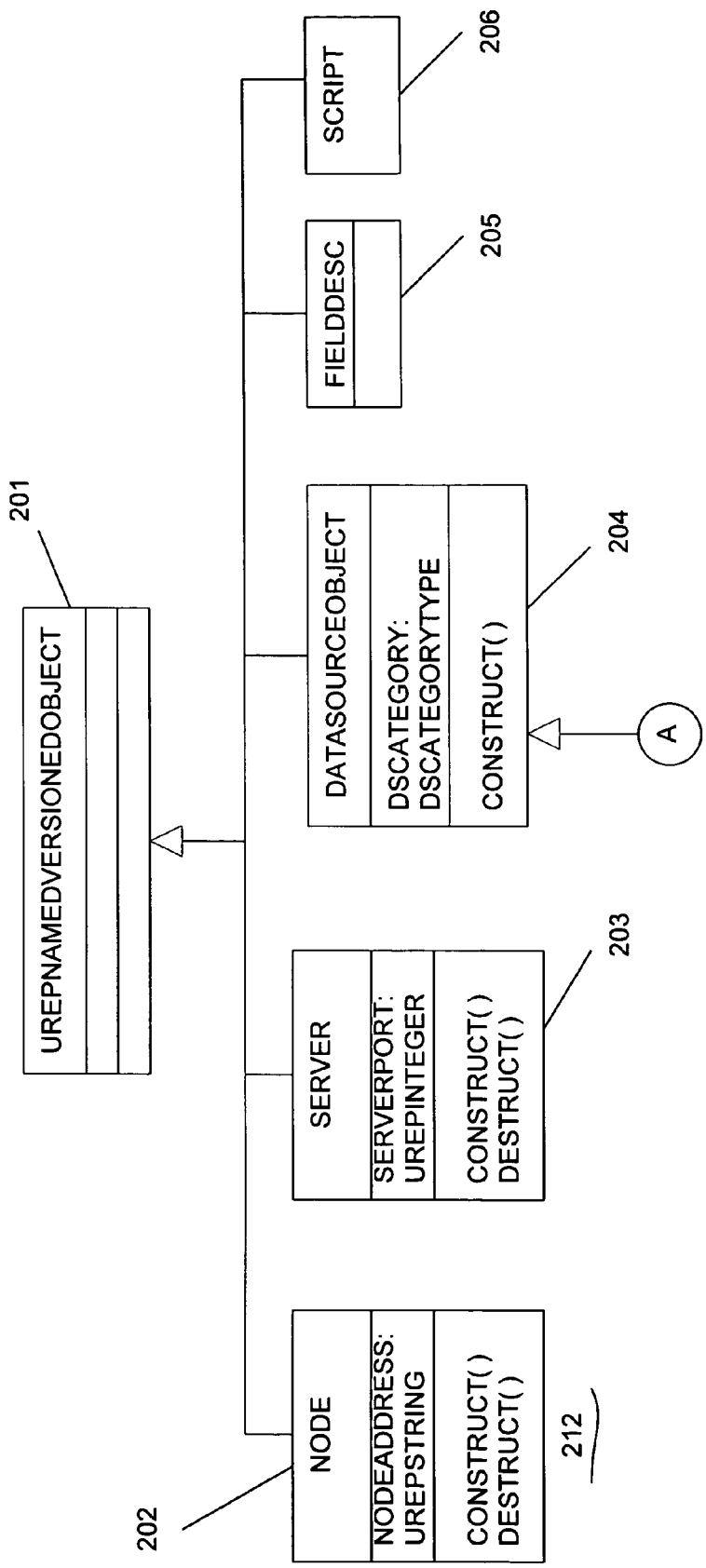
FIG. 5 is an inheritance diagram illustrating metadata employed according to the preferred embodiment.
Figure 5B:
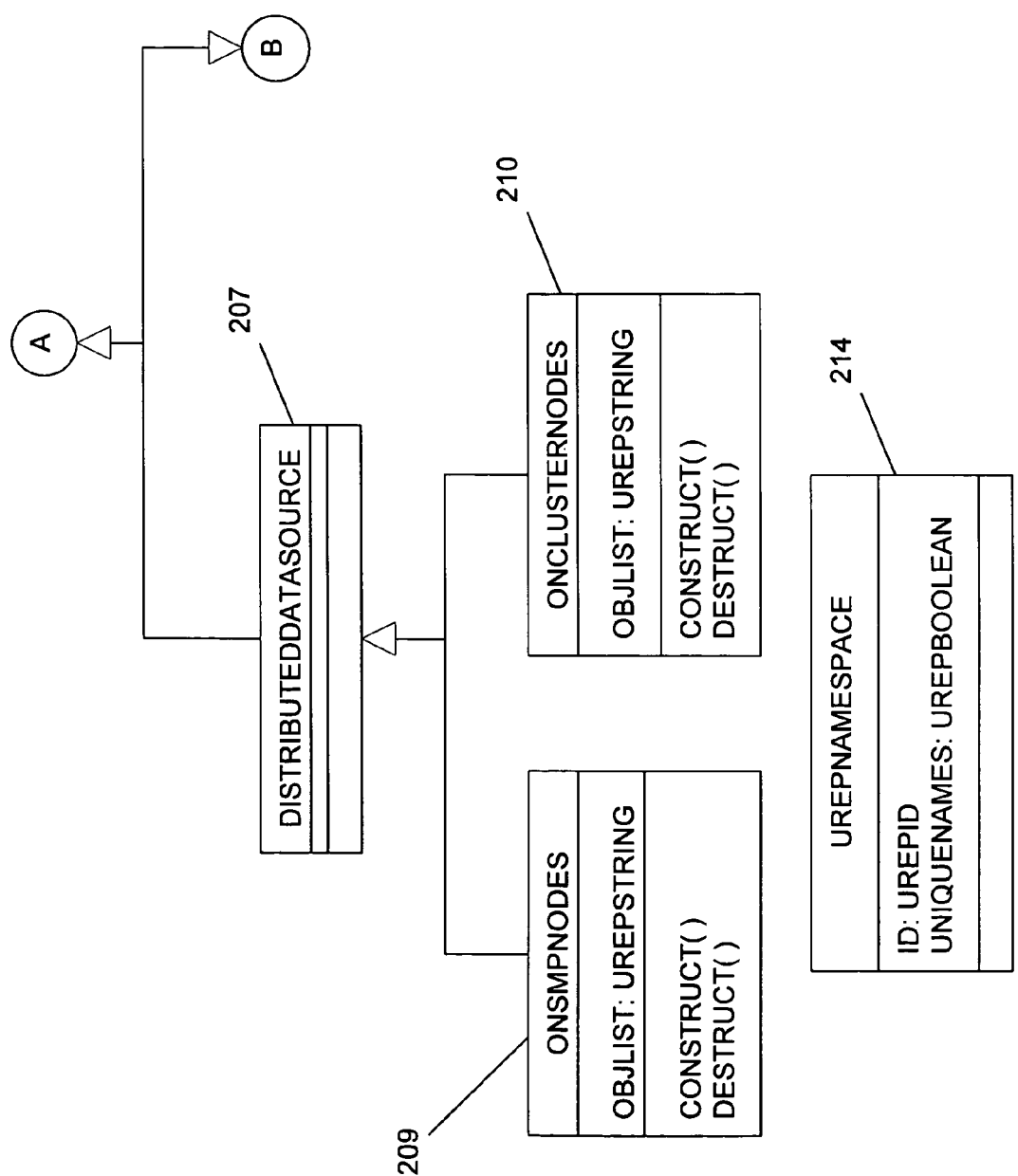
Figure 5C:
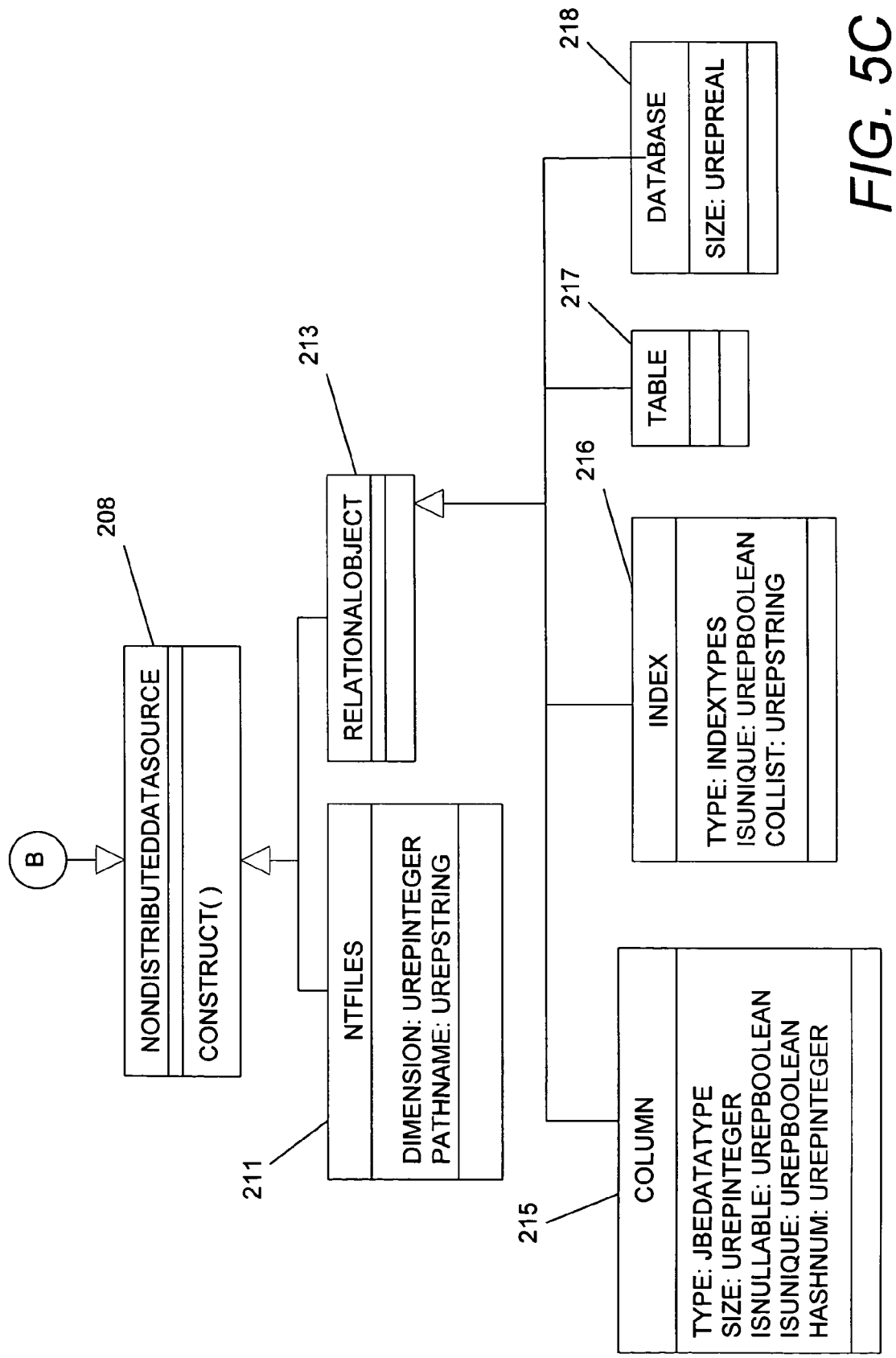

FIG. 5 is an inheritance diagram further illustrating organization of the metadata according to the embodiment under discussion. The box labeled "UREP Named Version Object" 201 represents the highest level of abstraction in the UREP and comprises a collection of data objects. The diagram of FIG. 5 illustrates the basic concept that each data object contains embedded data and methods (operations) applied against the data where the data further consists of attributes and types.

FIG. 5 illustrates a second level of abstraction 212, which includes derived classes identified as System Node 202, System Server 203, Data Source Object 204, Field Desc 205 and System Script 206. Thus, each data object has associated therewith information as to the system node(s) where it resides, the system servers within a node which access it, its attribute as being distributed or nondistributed, the field descriptors for NT files and the methods associated with it.

The System Node class 202 includes information sufficient to describe each node in a cluster including attributes such as the Node Address which may, for example, represent an internet port sufficient to locate a node in question. The class 202 further includes construct( ) and destruct( ) methods to create or destroy a node.

The System Server class 203 includes all attributes and parameters regarding each server which resides on a node, where the "server" comprises the messenger, agent and assistant agent codes, i.e., everything necessary to receive a script and to execute it. The server attribute illustrated in FIG. 5 is the server port, which is the address (node and port) at which incoming messages are "listened for" by the messenger of the server in question.

The Data Source Object 204 comprises the names used for various objects in the script. The attribute "DSC category" indicates whether the particular object is distributed (207) or nondistributed (208). A distributed object 207 further includes subclasses 209, 210 as to the type of distribution, i.e., across SMP nodes or across nodes of a cluster. The "ObjList" attribute gives a list of the databases contained within the distributed data source name. In other words, the object name is broken down into sub-names which exist on the different nodes.

Non Distributed Data Sources 208 typically are either NT files 211 or a relational database object 213, which further break down into column, index, table and size schema 215, 216, 217, 218 as known to those skilled in the art.

The Script class 206 contains the location of any otherwise unrecognized programs or methods and could contain programs or methods contained in URL's, in CORBA ORB environments, X/OPEN OLTP environments, as well as in local or remote NT executables or other script files.

Thus, a system Node contains one or more servers, each of which hosts its own set of Data Source Objects. The relationships represented in FIG. 5 and contained in the metadata indicate what Data Source Objects are related to which servers and thus supply the information necessary to create the local data source descriptor files at run-time.

The information represented by FIG. 5 is preferably captured at system set-up using a graphical interface under control of a system administrator with as much automation as possible in order to avoid unnecessary data entry. For example, such an interface provides automatic scanning of the rows and columns of a relational database. Once set up, the system runs applications automatically as illustrated herein.

The metadata may also include the location of otherwise unrecognized services, the API's (application programming interfaces) or protocols to be used in invoking services (effectively wrapping the "foreign" services). Services may also be sought in trading (OMG, ODP, etc.) networks, allowing a broad heterogeneity of service access, execution and creation. In this way, services invoked as a simple JAVA method may actually have been provided in Open/OLTP, Corba objects, Microsoft DCOM/COM+, Sun EJB, Linc, MAPPER, . . . , or other environments. In this respect, an infrastructure is provided akin to a parallel nervous system for the invocation and integration of heterogeneous services (invoked as JAVA methods). A system according to the preferred embodiment can span platforms, OS's, and architectures without a requirement for changes in the underlying OS.

Figure 6:
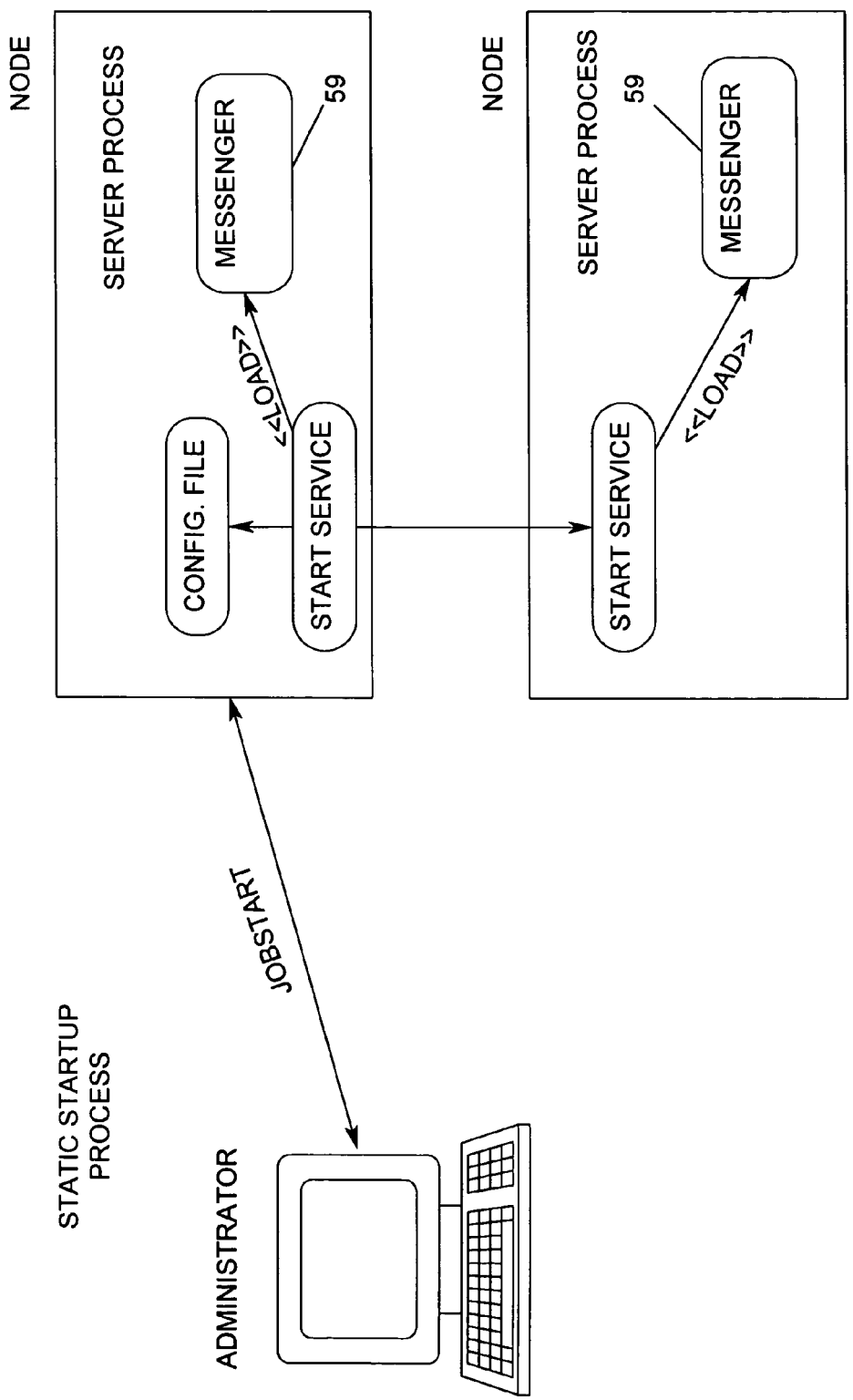
FIG. 6 is a schematic block diagram illustrating a node employing a static start-up process.

In an implementation according to FIG. 6, servers implementing the preferred embodiment run on all the nodes of a system which may be, for example, a cluster, a Uniysis cellular multiprocessing system (CMP), a network, or an SMP (symmetrical multiprocessor). The servers are preferably started by executing a program, "jobstart," from any node in the system. "Jobstart" calls an NT service, registered as "Start Service" automatically at "boot" time on each of the systems nodes, defined in a configuration file. The "Start Service" serves as a listener on the host node in question, performing the loading and invocation of the local runtime processes comprising the messenger and agent. Multiple processes may be activated, automatically, in the same node depending on performance considerations. As soon as the servers have been activated, the runtime process is ready to accept client requests.

Figure 7:
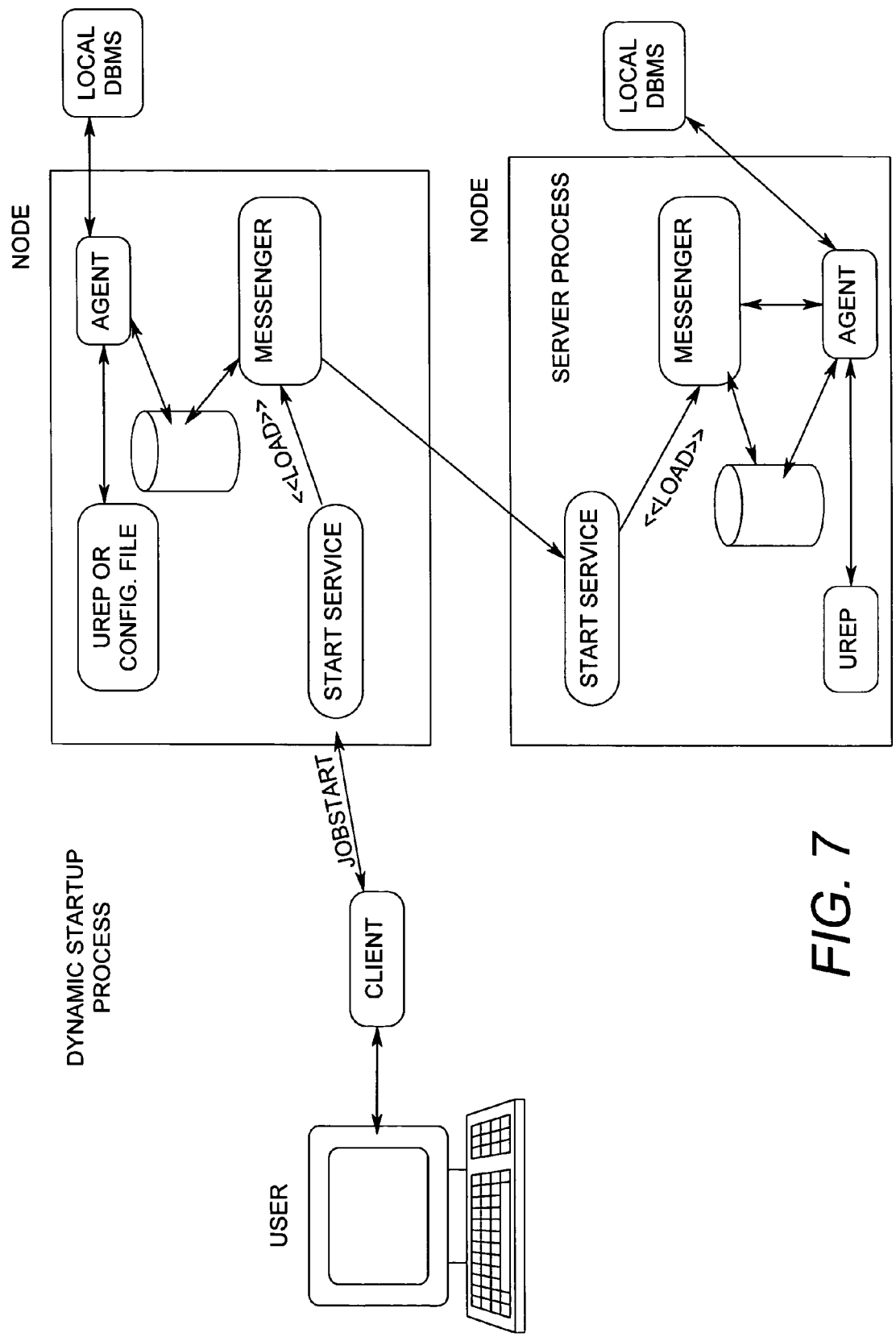
FIG. 7 is a schematic block diagram illustrating a node employing a dynamic start-up process.

In FIG. 7, the configuration of FIG. 6 is shown supplemented by a repository (UREP). Instead of a static start-up of all the servers in the system, a dynamic invocation, based on the client (user) request, is now provided. Based on the data source name (data object) supplied in the client request, the server to which the client application is attached, in processing the user request, retrieves from the repository the details of the locations which support the data source. The Agent process interpreting the scripts then dynamically activates only the servers required to support the user's request. The Agent is shown interacting with a DBMS (Database Management System). A hardware component suitable for implementing the system servers in a system like that of FIG. 1, 6 or 7 is the Aquanta as manufactured by Unisys Corporation, Bluebell, Pa.

The Messenger is loaded and activated by the local NT service (the Start Service) on each node in the system. Initially, the client application, responding to a user's request, establishes a connection, via the WinSock interface, with this process (server). The server (process) acts as a "messenger" between the client and the agent process for the particular user. The "messenger" performs four key functions:

Acts as the "listener" to receive user requests from the client or from an agent on another node.

Sends the results of the request back to the submitter of the request (the client or an agent on another node).

Manages the creation of, and the assignment of tasks to, agent and assistant processes.

Sends and receives messages to and from these agents and assistants, using shared memory.

As noted above, the Agent process accepts and sends messages from and to the request queue, maintained by the messenger. As illustrated above, the key functions performed by the agent are to parse and process each request in the JAVA script, often resulting in operations on named data sources within the system which may be heterogeneous (e.g., in NT files, SQL Server, Oracle, . . . ) and distributed. In so doing, the agent looks up the descriptor of the data source. If the data is distributed across multiple nodes, the agent rewrites the script as multiple scripts. Each of the latter scripts consists of the operations, for a particular node specified in the descriptor, to be performed on the data sets residing in that node. These scripts are then sent to the "assistant" processes on these other nodes in accordance with the "function shipping" model. The system will typically be configured to run with an initial number of agent processes, with a maximum also specified.

In FIGS. 6 and 7 "node" is used to describe the physical hardware, e.g., an Aquanta server (as in a "node on the network" or a "node of a cluster"). A server is the "apparatus" residing on that node comprising the messenger, agent and assistant code modules. Multiple servers may reside on a single node. The servers may be viewed as comprising part of a "federation." A federation is a group of servers which have access to the same data, objects and scripts. There may be more than one federation in a system.

Figure 8:
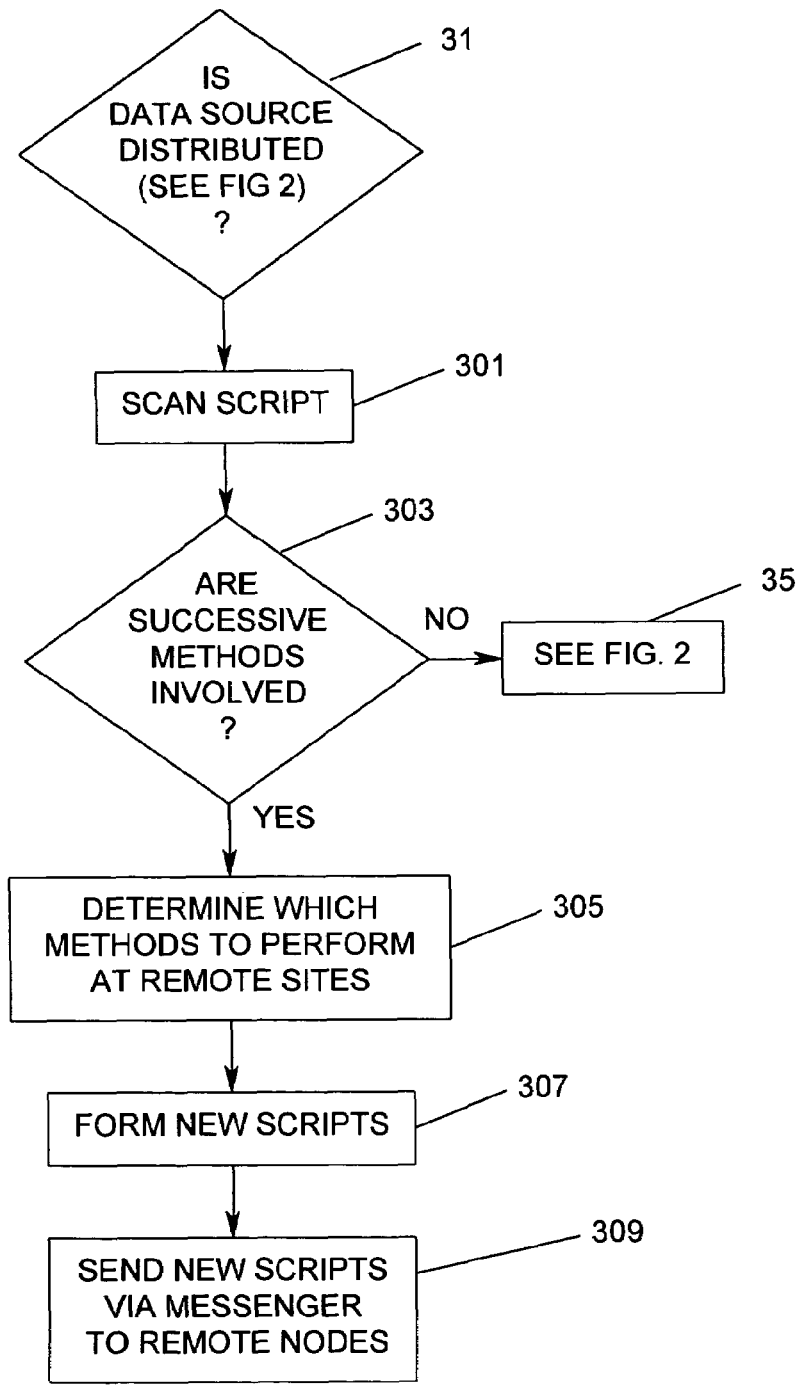
FIG. 8 illustrates operation of an agent process at a local node in response to a request containing concatenated methods.

FIG. 8 illustrates processing of a script which contains multiple successive or "concatenated" methods. In test 31 of FIG. 8, the metadata is checked by the agent at the local site to determine whether the data source is distributed. Test 31 corresponds to test 31 of FIG. 2.

In Step 301, the local agent scans the script. In test 303, the local agent determines whether successive methods are included in the script. If not, the routine proceeds to step 35 of FIG. 2 of the original application.

If successive methods are involved, the flow proceeds to step 305 where the local agent determines which methods should be performed at the remote sites. This determination is preferably made by accessing a simple table which indicates whether a selected method should be performed remotely adjacent the data or at the user site upon the returned results.

In step 307, the statement is broken into scripts appropriate to the servers at the remote nodes. For example, one may propound the statement:

population.search( ).sort( ).mail( )

to search, for example, the population of the United States for people with particular attributes, sort the results of the search, and then mail the results of the sort. In such case, if the data in "population" were distributed across databases in servers on nodes 1, 3 and 5, the script:

population.search( ).sort( ).

is sent to the servers at each of the nodes 1, 3 and 5. Thus, in this example, the local agent has determined from a table that "search" and "sort" are methods designated for performance at the remote sites, and has generated an appropriate script to send to each of the sites.

The assistant agent at each of the remote servers on nodes 1, 3 and 5 then interprets the respective script and, on finding the successive methods, search( ).sort( ), performs the first method (search( )) and then leaves the results of that method stored in memory, rather than causing the results to be returned to the coordinating local agent. The second (or further) method(s) are then performed on the results of the earlier method(s), and only when the results of the succession of methods are complete, are the results returned to be merged by the coordinating agent. In this way, if the data object ("population") is distributed, the methods (search, sort) are performed automatically in parallel on the distributed data.

Figure 9:
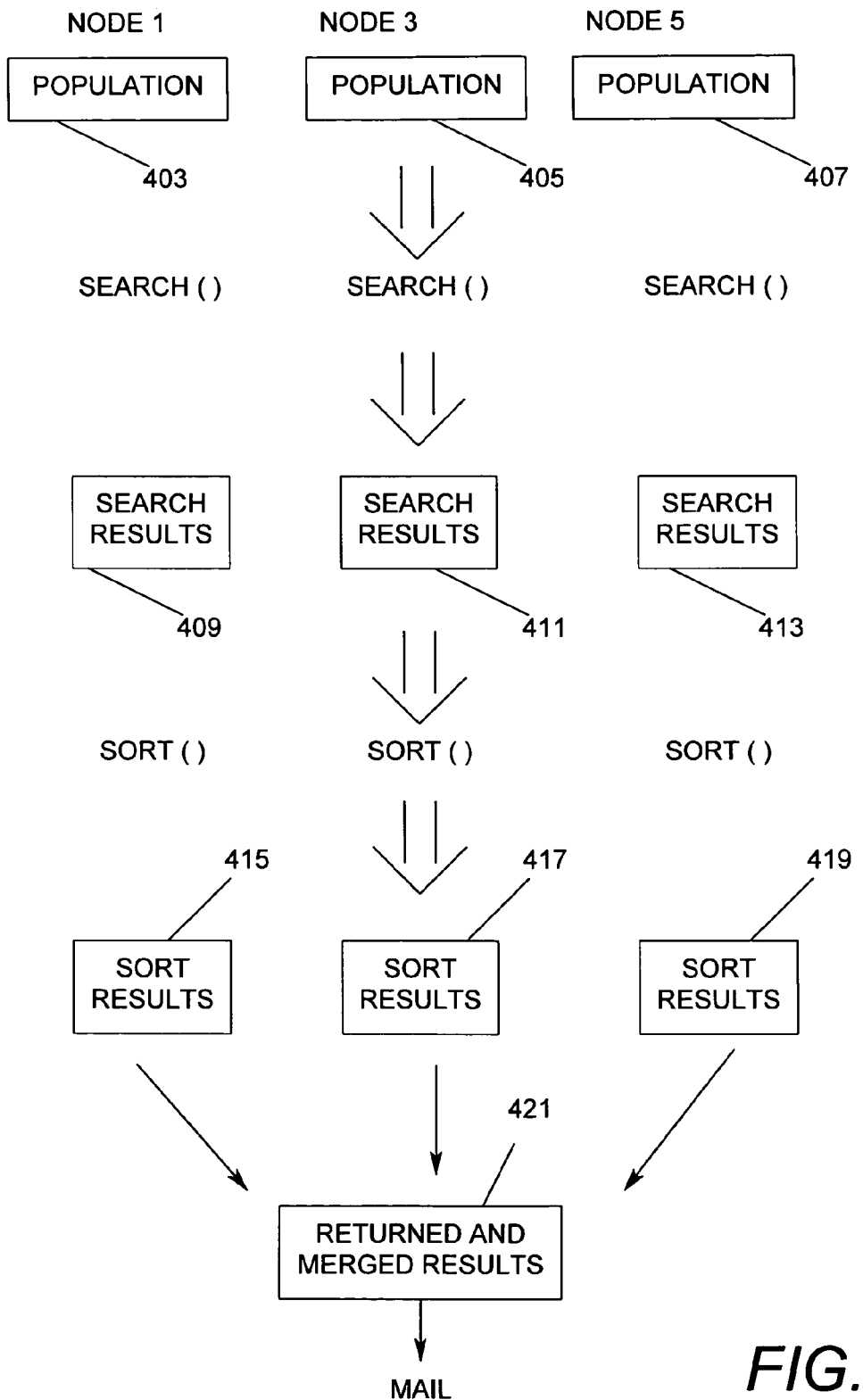
FIG. 9 illustrates operation of an agent process at a remote node in response to a message generated according to FIG. 8.

An example of operation of the remote agent is illustrated in FIG. 9. The data object "population" 403, 405, 407 is retrieved at each of three respective nodes: Node 1, Node 2 and Node 3. The method "search( )" is performed by the remote agent on each respective data object, producing respective search results 409, 411, 413 stored temporarily in memory at each of the respective Nodes. The remote agent then executes "sort( )" on each of the respective search results, yielding respective sort results 415, 417, 419. The remote agents then transfer the respective sort results to the respective remote messengers, which return them to a coordinating agent at the originating site. The coordinating agent creates the merged results 421 and executes the Mail method to e-mail the final results.

The search, sort and mail methods are described further in connection with the following discussion of a preferred set of methods performed by the Agent and summarized in the following table:

TABLE I

SYSTEM METHODS

| | SQL Server | NT File | ORACLE | MNT | CLUSTER | TEMP |
|---|---|---|---|---|---|---|
| 1 | info | info | info | info | info | info |
| 2 | format | format | format | format | format | format |
| 3 | groupby | groupby | groupby | groupby | groupby | groupby |
| 4 | compute | compute | compute | compute | compute | compute |
| 5 | search | search | search | search | search | search |
| 6 | sort | sort | sort | sort | sort | sort |
| 7 | load | load | load | load | load | load |
| 8 | copy | copy | copy | copy | copy | copy |
| 9 | extract | extract | extract | extract | extract | extract |
| 10 | remove | remove | remove | remove | remove | remove |
| 11 | modify | modify | modify | modify | modify | modify |
| 12 | join | join | join | join | join | join |
| 13 | mpl | mpl | mpl | mpl | mpl | mpl |
| 14 | size | size | size | size | size | size |

The provision of such a set of key methods (the basic components of every application) greatly enhances the ease of application development. Additional methods employed are reflected in the following Table II. In addition, of course, user-written methods may be invoked.

TABLE II

| | SQL Server | NT File | ORACLE | MNT | CLUSTER | TEMP |
|---|---|---|---|---|---|---|
| 1 | adon | adon | adon | adon | adon | adon |
| 2 | adto | adto | adto | adto | adto | adto |
| 3 | find | find | find | find | find | find |
| 4 | update | update | update | update | update | update |
| 5 | first | first | first | first | first | first |
| 6 | | mail | | | | mail |
| 7 | | print | | | | print |
| 8 | | save | | | | save |
| 9 | | saveObject | | | | saveObject |
| 10 | | SaveScript | | | | SaveScript |
| 11 | | read | | | | read |
| 12 | | write | | | | write |
| 13 | | close | | | | close |
| 14 | | index | | | | index |

Further, according to the preferred embodiment, the following logic, controls, environmental variables and commands are provided:

TABLE III

SYSTEM COMMANDS

| Logic | control | environment | commands |
|---|---|---|---|
| if | import | time$ | sleep ( ) |
| else | local | date$ | close ( ) |
| while | main | day$ | write ( ) |
| try | private | mon$ | system ( ) |
| catch | | year$ | format ( ) |
| continue | | wday$ | audio ( ) |
| break | | mday$ | debug ( ) |
| | dir$ | mpl ( ) | |
| | | | trace ( ) |

Further discussion of exemplary implementation of various controls, commands and methods will further illustrate the utility, structure and operation, and advantages of the preferred embodiment.

IMPORT: Control

The import control is used to identify a data object from the repository. The object name following the import statement is a unique name in the system. As noted, the different data sources processed according to the preferred embodiment are SQL server, Oracle, NT files, and Multiply NT files. The data object may, of course, include other data sources.

The import statement makes available to the script interpreter (agent) all the metadata files describing the contents of the selected data object. The first occurrence of "import" causes the appropriate data source descriptor file to be set up at each node of the system. Each such descriptor file containing the metadata corresponding to the data source object in the user written script. The API required to access the data is also determined within this statement. The developer never has to be concerned about the type of data, whether the data is local, clustered, or even if the data is moved or columns modified. Because the script is interpreted at run time, all current column sizes, data location, API types, whether to use parallel methods and etc. are all handled dynamically.

Example

```
#import          Personnel
main ( )         {
    Personnel.sort ( birthday );
} //main
```

In the above example, . . .

LOCAL: Control

This control is used to identify a temporary data object or record set. The object name following the local statement will be a unique name for this script. The different temporary data sources which can be processed are SQL server, Oracle, NT files, clustered data sources and multiple NT files.

The LOCAL statement makes all connections required for this data object. It is possible for a data object to consist of Oracle and SQL server or any other data source. If there are multiple data sources, all connections are handled by this statement. The API required to access the data is also determined within this statement. The developer never has to be concerned about the type of data, whether the data is local, clustered, or even if the data is moved or columns modified. Because the script is interpreted at run time all current column sizes, data location, API types whether to use parallel methods, etc., are all handled dynamically.

Example

```
#import          Person
#local   recset  Result = new Person;
#local   recset  Rslt2 = {Person.first_name  Person.last_name}
#local   nt      picture = @data/bitmaps/picture.bmp{ }
#local   ms      table = data_source:tablename{1_name character(10)
                 f_name character (15) ssn character(9)}
```

```
main ( ) {
    Result.load(Person);
    Rslt2.load(Result);
} //main
```

Data Object Identifiers:

The following data object identifiers are used on the local control. This allows the interpreter to know which API to use to reference the data object.

| IDENTIFIER | DATA API |
|---|---|
| MS | Microsoft SQL Server |
| ORA | Oracle |
| NT | NT Files |
| RECSET | Temporary Table |

Script Variable Types:
The following script variable types are supported:
CHAR
INTEGER
SHORT
LONG
FLOAT
REAL
DOUBLE
DECIMAL
NUMERIC
BYTE
STRING
RECORD
DATE
TIME
TIMESTAMP SQL Data Types:
The following SQL data types in record databases are supported:

| SQL type | Size | Data Type |
|---|---|---|
| SQL_CHAR | 1 | char |
| SQL_VARCHAR | 1 | char |
| SQL_BIT | 1 | char |
| ;SQL_TINYINT | 4 | long |
| SQL_SMALLINT | 4 | long |
| SQL_INTEGER | 4 | long |
| SQL_BITINT | 4 | long |
| SQL_REAL | 8 | double |
| SQL_FLOAT | 8 | double |
| SQL_DECIMAL | 8 | double |
| SQL_NUMERIC | 8 | double |
| SQL_DOUBLE | 8 | double |
| SQL_DATE | 6 | DATE_STRUCT |
| SQL_TIME | 6 | TIME_STRUCT |
| SQL_TIMESTAMP | 16 | TIMESTAMP_STRUCT |

PRIVATE: Control

This control identifies and creates a variable for this script.

Here are some samples:

```
private     int      aa;
private     long     aa;
private     short    aa;
private     int      aa,bb:
```

-continued

```
private      int         aa = 10, bb = 20;
private      string      strg;
private      char        chr;
private      char[20]    buf;
private      char        buf[201] = "abcdefg";
private      double      dbl = 10.25;
private      float       flt = 10.25;
private      record      rec = new data_object
```

Environmental Variables:

The system environmental variables can be used in the script just as any other string variable. There are also additional string variables and two reserved words, they are listed below:

```
time$           //   current time
date$           //   current date
day$            //   current day
mon$            //   current month
year$           //   current year
wday$           //   current week day
mday$           //   current month day
dir$            //   base director for this federation
Reserved words:
TRUE            //   A non zero value
FALSE           //   A zero value
```

TRACE: Control

This control will activate the trace code to aid in the debug of a script. It will write script logic records to the script trace file as they are processed. The write command will also write data to the same trace file. The greater the number, the more information dumped to the trace file. It is presently preferred to either use a two or three only.

An example of the "trace" control is:

```
#trace   2       //dump script record to trace file
                 //before it is executed
#import          Personnel
main( ) {
Personnel.search( if (birthday=="06/14/45");

);
write("Search complete");
close( ).mail(Charles.Hanson@unisys.com, "trace");
}    ///main
```

NOTE: The code in the "box" above identifies embedded script code. The embedded script code is contained as a parameter within the relevant method and will be interpreted as part of the definition of what the particular method should perform.

FORMAT( ): Function

This function is used to create a character string from multiple arguments. The syntax and rules of sprintf apply.

An example of the 'format' function is:

```
private     char        buf[20];
private     int         cnt = 25;
private     char [20]   name = "total";
main( ) }
    buf = format ("%s count=%d",name,cnt);
} //main
```

UPPER( ): Function

This function is used to convert the argument character string to upper case characters. It does not change the argument variable.

An example of the 'upper' function is:

```
private     char       buf[20]
private     char[20]   name = "abcdef";
main( ) {
    buf = upper(name);
} //main
```

LOWER( ): Function

This function is used to convert the argument character string to lower case characters. It does not change the argument variable.

An example of the 'lower' function is:

```
private     char       buf[20];
private     string     name = "ABCDEFGH";
main( ) {
    buf = lower(name);
} //main
```

STRIP( ): Function

This function is used to strip off all leading and trailing spaces in the argument character string. It does not change the argument variable.

An example is:

```
private     char       buf[20];
private     char[20]   name = " abcdef ";
main( ) {
    buf = strip(name);
} //main
```

CENTER( ): Function

This function is used to center the character string in the argument. It does not change the variable and the variable must be a character type of fixed length.

An example of the 'center' function is:

```
private     char       buf[20];
private     char[20]   name = "abcdef";
main( ) {
    buf = center(name);
} //main
```

LEFT( ): Function

This function is used to left justify the character string in the argument. It does not change the variable and the variable must be a character type of fixed length.

An example is:

```
private     char       buf[20];
private     char[20]   name = " abcdef";
main( ) {
    buf = left(name);
} //main
```

RIGHT( ): Function

This function is used to right justify the character string in the argument. It does not change the variable and the variable must be a character type of fixed length.

An example of the 'right' function is:

```
    private    char       buf[20];
    private    char[20]   name = "abcdef";
    main( ) {
        buf = right(name);
    } //main
```

FOR( ): Function

This function is the same as the 'for' function in JAVA.

An example of the 'for' function is:

```
    private    int        a;
    main( ) {
        for(a=0; a < 10; ++a) {
            // do some logic
        } ;
    } //main
```

WHILE( ): Function

This function is the same as the 'while' function in JAVA.

An example of the 'while' function is:

```
    private    int        a = 0;
    main( ) {
        while(a++ < 10) ) {
            // do some logic
        } //while
    } //main
```

BREAK( ): Function

This function is the same as the 'break' function in JAVA.

An example of the 'break' function is:

```
    private    int        a;
    main( ) {
        for(a=0; a < 10; ++a) {
            if (a = = 5) {
                break
            }
            // do some logic
        } // for
    } //main
```

CONTINUE( ): Function

This function is the same as the 'continue' function in JAVA.

An example of the 'continue ' function is:

```
    private    int        a;
    main( ) {
        for(a 32 0; a < 10; ++a) {
            if (a = = 8) {
                a = 0
                continue
            }
            // do some logic
        } //for
    } //main
```

EXIT( ): Function

This function is the same as the 'exit' function in JAVA.

An example of the 'exit' function is:

```
    main( ) {
        if (more_to_do = = FALSE) {
            exit( );
        }
    } //main
```

IF( ): Function

This function is the same as the 'if' function in JAVA.

An example of the 'if' function is:

```
    private        int        a = 0;
    main( ) {
        if (a < 10) {
            // do some logic
        } else {
            // do some more logic
        }
    } //main
```

TRY: Function

This function will allow you to watch for application errors and then break out of the code and jump to a catch routine. It is the same as the 'try' function in JAVA.

An example of the 'try' function is:

```
    main( ) {
        try {
            // do some logic
        } catch () {
            // do error handling
        }
    } //main
```

CATCH: Function

This function is for handling error conditions. The argument of the control is ignored currently.

An example of the 'catch' function is:

```
    main( ) {
        try {
            // do some logic
        } catch( ) {
            // do error handling
        }
    } //main
```

SWITCH: Function

This function allows you to selectively do code depending on the value of a variable. It works in conjunction with case statement. It is the same as the 'switch' function in JAVA.

An example of the 'switch' function is:

```
    private int        cnt = 1
    main( ) {
        switch (cnt) {
            case 0:
                break;
            case 1:
```

-continued

```
            break;
            default:
            break;
        } //switch
} //main
```

CASE: Function

This function allows you to selectively do code when the value of the switch statement object matches the value of the case statement. It works in conjunction with the switch statement. It is the same as the 'case' statement in JAVA.

An example of the 'case' function is:

```
        private int         cnt = 1
        main( ) {
            switch (cnt) {
                case 0:
                break;
                case 1:
                break;
                default:
                break;
            } //switch
        } //main
```

DEFAULT: Function

This function will allow you to identify code as default when there is not a match for the case statement. It works in conjunction with switch and case statements. It is the same as the 'default' statement in JAVA.

An example of the 'default' function is:

```
        private int         cnt = 1
        main( ) {
            switch (cnt) {
                case 0:
                break;
                case 1:
                break;
                default:
                break;
            } //switch
        } //main
```

SQLINFO: (SQL_SERVER) Command

This command creates a temporary data object that contains the information included in the data source name and table name referenced in the argument. The information contained in the data resulting file identifies the server where the data object is located, the type of data (SQL SERVER) and its data source name and table name. It also includes all column names, types and sizes. The object created by this command may then be added to the system with the SAVEOBJECT method discussed in further detail below.

The following example illustrates connection to a SQL SERVER data source with the name of "tpcd" to create the metadata for the table "lineitem." This information would then be recorded as a data object ("tpcd1") in the metadata. This is to make it easy to create the metadata corresponding to existing SQL Server and Oracle files.

Example

```
        main( ) {
            sqlinfo ("tpcd:lineitem") .saveobject ("tpcd1");
        } //main
```

ORACLEINFO: (ORACLE) Command

This command creates a temporary data object that contains the information included in the data source name and table name specified in the argument. The information contained in the resulting file identifies the server where the data object is located, the type of data (ORACLE) and its data source name and table name. It also includes all column names, types and sizes. The object created by this command could then be added to the system with the saveobject method.

The example connects to an Oracle data source with the name of "tpcd" and creates the metadata for the table "lineitem". This information is then recorded as a data object ("tpcd2") in the metadata.

Example

```
        main( ) {
            oracleinfo("tpcd:lineitem").saveobject("tpcd2");
        } //main
```

MAIL: Command

This command is used to send e-mail. There are three arguments of which only the first one is required. The first argument is a character string containing the person's e-mail address. The second is the subject and the third argument is the body of the message.

The example below searches the Personnel data object for employees with a birthday today identified by environmental variable date$. It then reads the records and sends an e-mail to each employee with a birthday.

Example

```
    #import            Personnel
    private record     rec = new Personnel;
    private char       buf[200];
    private string     bf="hope you have a wonderful day"
        Personnel.search(
            if (birthday = = "date$);
        );
        while (rec = this.read( ) ) {
            buf = format ("Happy birthday %s %s",
                        rec.first_name,bf);
            mail (rec.email, "birthday greetings",buf);
        } // while
} //    main.
```

WRITE: Command

This command is used to aid in the debug of applications. The data specified is written to the trace file of the script. The trace command also writes to this same file.

There are different forms to the arguments.

write("character string only");

write(data_record_object);

The example below will write the character string with the value of cnt to the trace file.

```
        private int cnt = 25
        main( ) {
            write(format("The value of cnt = %d", cnt ))
        } //main
```

SLEEP: Command

This command will suspend the script for the amount of milliseconds specified in the argument.

The example below will suspend the script for one minute.

Example

```
main( ) {
    sleep (60000);
} //main
```

CLOSE: Command

This command will close the trace file and make it the current "this" object.

This example creates a trace file and e-mails it to a fictitious programmer.

```
#trace 2
#import      Personnel
main( ) {
    Personnel.search(
        if (birthday = = "06/14/55");
    );
    close( );
    this.mail("Charles.Hanson@unisys.com," , "ERR");
}//main
```

OBJECTS: Command:

This command will create a temporary data object that contains a list of all the data object names in the federation.

The example will display using notepad a list of all data objects in this federation.

```
main( ) {
    objects( ).display( );
} //main
```

FORMAT: Command

This command will format a character string. The basic rules of a sprintf command in c++ apply.

The example will write the current date and time.

Example

```
#import       Client
private char  buf[100];
main( ) {
    buf = format("%s - - %s", date$,time$);
    Client.write(buf);
} //main
```

MPL: Command

This command starts either a named script or a data object, which contains a script, on the server specified by the second argument. If the second argument is omitted then it will start the script on the local server. The new started script runs as an independent script and will not return to the requesting script.

Example

```
#local view script={ }
main( ) {
    mpl("strip_data",4);
    script.write("#import Personnel      ");
    script.write("main () {               ");
    script.write("Personnel.search(       ");
    script.write(" if(state= = /"CA/"     ");
    script.write("                        ");
    script.write("this.format(/"%s,%s/",  ");
    script.write("last_name, first_name); ";
    script.write("this.print( );          ";
    script.write("}                       ";
    script.close( );
    mpl(script,5);
} //main
```

EXECUTE: Command

This command executes the program of the first argument on the server specified by the second argument. If the second argument is omitted, then it will start the executable program on the local server. The executable program runs as an independent program and will not return to the requesting script.

Example

```
main( ) {
    execute("xyz.exe",4);
    execute("xyz.bat",5);
} //main
```

AUDIO: Command

This command will play the wav file specified by the argument. The wav file must exist in the directory specified for messages.

Example

```
main( ) {
    audio("greetings");
} //main
```

WRITE: Method

This method is used to send multiple character records to the data object referenced in the script. The method supplies one record at a time.

Client.write("character string only";
Client.write(data_object);

The example below searches the Personnel data object for employees with a birthday on June 14. Notice the wild card character ('☒ ') is used to only search part of the column. The result of the search will be reformatted into three columns with commas separating them.

Example

```
#import      Personnel
#import      Client
main( ) {
    Personnel.search (
        if (birthday = = "06/14/!");
    )
    this.format("%s,%s,%s",last_name,first_name,ssn);
    Client.write(this);
} //
```

WRITE: Method of Temporary Data Objects

This method is used for constructing reports that one would e-mail, fax, print or send to a bean.

There are different forms to the arguments.
Data_object.write("character string only");
Data_object.write(data_record_object);

The first use of this method in a script creates a new object or erases the existing object if it existed. Every reference after the first adds records to the method's object. Before other methods can reference this new object a 'close' method must be performed on it.

The example below writes two records to the temporary data object called temp and then sends the result to the bean. Notice that the close method is required before the data is sent. The second example below achieves the same results.

Example

```
#import      Client
#local       recset       temp={ }
main( ) {
    temp.write(format(The number of records = %d", 25));
    temp.write ("This will be the second record of the data object
called temp")'
    temp.close;
    Client.write(temp);
} //
```

INFO: Method

This method creates a temporary NT file that contains the data definition for the method's object. The information contained in the data definition file identifies the server where the data object is located, the type of data (Oracle, SQL SERVER,NT file) and its table name and data space. It also includes all column names, types and sizes.

Example

```
#import      Personnel
main( ) {
    Personnel.info( ) .display( );
} //main
```

FORMAT: Method

This method creates a temporary data object by mergfing character strings and data columns from the data object. The basic rules of a sprintf command in c++ apply. Every record of the method's object is processed.

The example below creates a temporary data object. The record of the new object contains the data from two columns (last_name, first_name) separated with two '—' characters. The temporary data object will have the same number of records as the original data object and is sent to a bean.

Example

```
#import      Personnel
#import      Client
main( ) {
    Personnel.format("%s - - %s",
              last_name, first_name);
    Client.write(this);
} //main.
```

LOAD: Method

This method loads the method's object with the data object in its arguments. If the column names of the objects do not match, the columns are left blank. Only the like columns are loaded. If columns are the same type but different lengths they are either truncated or expanded to the size of the receiving column. If the data object already existed all records will be deleted, and the data object will only contain the new records. If the data object did not exist, a new one will be created. If the column types changed from the previous data object, then a remove method must be called before overloading the new object.

Example

```
#import      Personnel
#import      Payroll
main( ) {
    Payroll.load(Personnel);
} //mail.
```

SORT: Method

This method sorts the method's object by the column(s) in its arguments. If there are multiple columns, the order of the sort is determined by the order of the columns. Descending sort is specified by a "(d)" following the column name. If the arguments contain a numeric value, that value determines the maximum number of records to return.

The example below sorts the Personnel data object on state column (ascending) and the secondary level sort on last_name column in descending order. The numeric "10" specifies to return a maximum of 10 records. A maximum of 10 records containing two columns (state and last_name) will be returned.

Example

```
#import      Client
#import      Personnel
#local recset temp={Personnel,state
                    Personnel.last_name}
main( ) {
    Personnel.sort(state, last_name(d),10);
    temp.load(this);
Client.write(temp);
} //main
```

SEARCH: Method

This method uses an embedded script within its arguments. The embedded script is interpreted by the method and executed for every record in the method's object. The result of this method is a temporary data object containing all the records that match the search criteria.

The example below searches the Personnel data object and sorts all records where the state column is either "CA" or "MN". The records returned contain two columns (state and last_name) that are separated by a comma.

Example

```
#import      Client
#import      Personnel
main( ) {
    Personnel.search (
        if (state = = "CA" || state = = "MN");
            );
    this.sort(last_name);
    this.format("%s,%s",state,last_name);
    Client.write(this);
} main
```

GROUPBY: Method

This method uses an embedded script within its arguments. Before the embedded script is interpreted by the method, the records that satisfy the request are selected and then sorted by the object(s) defined within parenthesis. The embedded script is then performed on the sorted records. Any variable values or objects changed in the embedded script will also be changed in the main script. The example below processes two states from the Personnel data object and then groups by state and returns two records containing the state and number of records for that state.

Example

```
#import      Client
#import      Personnel
#local       recset        temp={ }
private      int           cnt=0 ;
main( ) {
    Personnel.groupby( (state)
        if    (state = = "CA" | | state = = "MN")
{
  if (EQUAL) {
    ++cnt;
  } else {
    temp.write(format ("state %s = %d",
                                Personnel.state,cnt) );
    cnt = 0 ;
  }
}
);
Client.write (temp) ;
} //main
```

EXTRACT: Method

This method uses an embedded script within its arguments. The embedded script is interpreted by the method and executed for every record in the method's object. Every record in the database that matches the search criteria will be deleted from the data object, and a temporary object containing the records will be the result of the method.

The example below will search the Personnel data object and return all records that state column is either "CA" or "MN". It also will delete these records from the data object. The records returned contain two columns (state and last_name).

Example

```
#import      Client
#import      Personnel
main( ) {
    Personnel.extract(
        if (state = = "CA" || state = = "MN");
    );
    this.format("%s,%s",state,last_name);
    Client.write(this);
} //main
```

SAVEOBJECT: Method

This method is used to create a new data object name or to create a data object on another server to allow parallel activity. The data object name identified by the arguments is added to the list of system objects available to all members of the system. Once the object name is added to the system it requires a load or adon method to insert data. The method's object is an NT file identical to the result of the info method.

Example

```
#import      Personnel
main( ) {
    Personnel.info( ).display( ).saveobject("objectx");
} //main.
```

MAIL: Method

This method is used to send e-mail. The method's object is sent as an attachment. There are three arguments of which only the first one is required. The first argument is a character string containing the person's e-mail address.

The example below searches the Personnel data object for employees with a particular birthdate. It then reads all records and sends e-mail to each employee with a birthday.

Example

```
#import           Personnel
#import           Birthdaycard
private           record rec = new Personnel;
private           char buf[200];
private string    bf="hope you have a wonderful day";
main ( ) {
    Personnel.search(
        if (birthdate = = date$) ;
    ) ;
    while(rec = this.read( ) ) {
            buf = format("Happy birthday %s %s",
                                rec.first_name,bf) ;
            Birthdaycard.mail(rec.email,
                                "birthday greetings",buf) ;
    } //while
} //main
```

STATUS: Method

This method is used to send single record character strings. There are different forms to the arguments.

Client.status("character string only");
Client.status(data_object);

The example below will send a character string, "We are performing your request".

Example

```
#import      Client
main( ) {
    Client.status("We are performing your request");
} //main
```

READ: Method

This method suspends the script and waits until it receives an input. The method loads the variable(s) in the arguments with the input. If there are multiple variables, then a comma in the input string will separate the data, and the variables will get loaded in order.

The example below will take a character string and parse it. The first part, until a comma is encountered, will be loaded into the bdate variable and the data following the comma will be interpreted as a number and loaded into the e_sal variable.

Example

```
#import      Personnel
#import      Client
private      char      bdate[20];
private      int       e_sal;
```

-continued

```
main( ) {
    Client.read( bdate, e_sal );
    Personnel.search(
        if (birthday >bdate && salary>e_sal);
    )
    this.format("%s,%s,%s",last_name,first_name,ssn);
    Client.write(this);
} //main
```

SIZE: Method

This method returns the number of records in the method's object.

The example below will get the number of records from Personnel data object and return the value.

Example

```
#import      Client
#import      Personnel
private   int      records=);
main( ) {
    records = Personnel.size( );
    Client.write(format ("The number of records in
                Personnel = %d",records));
} //main
```

DISPLAY: Method

This method displays records in a notepad window. Its purpose is to help in the debug of a script.

The example below will open a notepad window with five records from Personnel data object.

Example

```
#import      Personnel
main( ) {
    Personnel.display( 5 );
} //main
```

COPY: Method

This method loads the method's object into the data object in its arguments. If the column names of the objects don't match the columns are left blank. Only the like columns are loaded. If columns are of the same type but different lengths, they will either be truncated or expanded to the size of the receiving column. If the method's object did not exist, it will be created. If the column types changed from the previous data object, then a remove method must be called before overloading the new object.

Example

```
#import      Personnel
#import      Payroll
main( ) {
    Personnel.copy(Payroll);
} //main
```

ADTO: Method

This method adds the method's object to the data object in its arguments. If the column names of the objects don't match the columns are left blank. Only the like columns are added. If the columns are of the same type but different lengths, they will either be truncated or expanded to the size of the receiving column.

Example

```
#import      Personnel
#import      Payroll
main( ) {
    Personnel.adto (Payroll);
} //main
```

ADON: Method

This method adds the data object in its arguments to the method's object. If the column names of the objects don't match, the columns are left blank. Only the like columns are added if the columns are of the same type, but different lengths, they will either be truncated or expanded to the size of the receiving column.

Example

```
#import      Personnel
#import      Payroll
main( ) {
    Personnel.adon (Payroll);
} //main
```

REMOVE: Method

This method removes the method's object from the system.

Example

```
#import      Payroll
main( ) {
    Personnel.remove( );
} //main
```

MODIFY: Method

This method uses an embedded script within its arguments. The embedded script is interpreted by the method and executed for every record in the method's object. This method updates every record in the method's object that match the search criteria. Any variable values changed in the embedded script are also changed in the main script.

The example below will add 10% to the salary column of the Personnel data object where the state column is either "CA" or "MN".

Example

```
#import      Personnel
main( ) {
    Personnel.modify (;
        if (state == "CA" || state == "MN") {
            salary += (salary * .10);
        }
    );
} //main
```

FIND: Method

This method uses an embedded script within its arguments. The embedded script is interpreted by the method and executed on every record until it finds a record in the method's object that match the search criteria. The method then inserts the record into a record variable for the main script to process.

The example below will find a record in the Personnel data object that match the search criteria and return it into the rec variable.
Example

```
#import      Personnel
private      record          rec= new Personnel'
main( ) {
    rec = Personnel.find(
    if    (ssn == "476504118")
    );
} //main
```

FINDLOCK: Method

This method uses an embedded script within its arguments. The embedded script is interpreted by the method and executed on every record until it finds a record in the method's object that match the search criteria. The method then will lock and insert the record into a record variable for the main script to process.

The example below will find a record in the Personnel data object that matches the search criteria and then lock it. If the lock is available, it will load the rec variable with the record. If the lock is not available, it will throw an exception.
Example

```
#import      Personnel
private      record          rec= new Personnel'
main( ) {
    while(FALSE = = (rec = Personnel.findloc (
                    if (ssn = = "476504118")
                    ) ) ) {
        sleep(1000) ;
    } //while
} //main
```

UPDATE: Method

This method must be preceded by a findlock method in the same script as the method's object. The record object in the arguments is updated back into the same record found in the preceding findlock.

The example below will find a record in the Personnel data object that matches the search criteria and return it into the rec variable. The phone column is changed and then the record is returned to the method's object.
Example

```
#import      Personnel
private      record          rec = new Personnel;
main( ) {
    rec = Personnel.findlock(
        if   (ssn == "476504118")
    );
    rec.phone - "425-881-5039";
    Personnel.update(rec);
} //main
```

COMPUTE: Method

This method uses an embedded script within its arguments. The embedded script is interpreted by the method and executed for every record in the method's object. Any variable values or objects changed in the embedded script are also changed in the main script.

The example below will only process two states from the Personnel data object and then group by state and return records containing the state and last name and first name.
Example

```
#import      Client
#import      Personnel
#local   recset    temp = { }
#local   recset    temp2 = { }
main ( ) {
    Personnel.compute(
    if       (state = = "CA" || state = = "MN") {
             if (state = = "CA") {
                 temp.write(format("California %s %s",
                 Personnel.last_name, Personnel.first_name) ) ;
             } else {
                 temp2.write(format("Minnesota %s %s",
                 Personnel.last_name, Personnel.first_name) ) ;
             }
        }
    }
    ) ;
    temp.adon(temp2) ;
    Client.write(temp) ;
} //main
```

JOIN: Method

This method creates a view of the data defined by the group of columns defined in the first set of parenthesis and then merges the columns from the two records whenever the "if" part of the argument is true.

The example below will create a temp data object that contains three columns (last_name, first_name and city). The temp data object is then returned.
Example

```
#import      Client
#import      Personnel
#import      Zipcodes
main ( ) {
    Personnel.join (
             (last_name,first_name,Zipcodes.city)
        if   (zip = = Zipcodes.zip ) ;
    );
    Client.write(this) ;
} //main
```

MPL: Method (Multiple Points of Logic):

This command starts either a named script or a data object, which contains a script. If the method's object is a clustered object, then the script will be started on each server with "this" set to the data object that resides on that server. If the method's object is not a cluster, then the script will be started on the same server or on a server specified by a second argument with "this" set to the method's object. When the scripts are completed the 'THIS' object from each server is returned and merged into a new 'THIS' result.
Example

```
#import      Personnel
#import      Client
main( ) {
    Personnel.mpl("strip_data");
    Client.write(this);
} //main
```

SAVESCRIPT: Method

This method is used to add the method's object (which is the script) and the script name identified by the arguments to the list of federation scripts available to all members of the federation. After the script is added to the federation list of scripts, that script can be used as a script or as a method that applies to all data objects.

Example

```
#local          nt         script=@scripts/example{ }
main( ) {
    script.display( );
    script.savescript("scripta");
} //main
```

PRINT: Method

This method is used to send the method's object to a printer. If no arguments are supplied, the default printer is identified in the config file for this server. The example below searches the Personnel data object for employees with a birthday this month. It will format the records and then print.

Example

```
#import           Personnel
main( ) {
    Personnel.search(
        if  (birthmonth == mon$)
    );
    this.format("%s %s",first_name,last)_name);
    this.print( );
} //main
```

THIS: Method

This method identifies the method's object as the current "THIS" object.

Example

```
#import           Payroll
main( ) {
    Payroll.this( );
    this.info( ).display( );
} //main
```

READ: Method

This method reads a record from the method's object and inserts it into a record variable. A FALSE condition is returned when there are no more records.

Example

```
#import           Personnel
#local      recset        tmp-{ }
private record           rec = new Personnel ;
main( ) {
    while (rec = Personnel.read( ) ) {
        tmp.write(format("%s %s",  rec.last_name,
                                    rec.first_name) ) ;
    } //while
    tmp.close( ) .display( ) ;
} //main
```

COLUMNS: Command

This command creates a temporary data object that contains a list of all the columns of the data object.

The example will display using notepad a list of all columns in the data object.

Example

```
#import Personnel
main( ) {
    Personnel.columns( ) .display( ) ;
} //main
```

METHODS: Command

This command creates a temporary data object that contains a list of all the columns of the data object.

The example will display using notepad a list of all columns in the data object.

Example:

```
#import Personnel
main( ) {
    Personnel.methods( ) .display( ) ;
} //main
```

The following code indicates how easily the system according to the preferred embodiment allows new functions to be invoked. In this case, a database, nt_data, is being searched for a particular State, and the results are being e-mailed (via Exchange) to the indicated address.

Example

```
# import nt_data
main ( ) {
    nt_data.search (if(state == "CA")).mail
        ("Bob.Hall@unisys.com")
}
```

As another example, one may search a database containing the population of the United States for persons with particular attributes, sort the results of the search, and fax the results of the sort—in one easy statement. If the database containing the population of the United States is distributed, the search and sort will be run automatically in parallel.

In installing the apparatus according to the preferred embodiment, one first defines a number of environmental variables. The value of FED_federation number points to the "trader" for the federation. The trader contains a map network drive or network share. The drive contains the scripts, data object definition files errors and other messages for this federation. It also contains a file which identifies the servers in the federation. The latter is called the Federation file.

This and the following information is contained in a repository (acting as a "trader"). The system administrator is guided, using a graphical user interface, through the specification of this configuration information. A repository application copies the information to the indicated local files (local to each server).

The value, FED_federation number.server number, identifies a base directory for the server "server number" within the federation "federation number". The apparatus uses the base directory for temporary files, scripts, data objects and NT files. The value of environmental variable, _PATH, provides the location of the apparatus executable.

The following illustrates a typical federation file, listing the servers within the federation. (This file is contained within the "trader", pointed to by FED_federation number.):
Federation Name=1
Server=10 "server name 10"
Server=1 "server name 1"
Server=2 "cluster 2"
Server=3 "server name 3"
Server=4 "server name 4"
Server=5 "server name 5"

The following illustrates a typical server configuration file, contained within the base directory for the server, pointed to by "_FED federation.server."
Typical configuration file
Federation=1
Listen on Port=3200
My server=10
Debug=0
Sound=1
Inp_msg_time=500
Pre_start_processor=1

"Pre_start_processor" indicates the initial number of agent processes in the server. If additional processes are required, they will be generated dynamically. The "Inp.msg.time" parameter is a time out value.

The Debug parameter specifies levels of debugging information to be written to the trace file (the parameter has values from 1 to 10). The Sound parameter indicates whether audio error and other messages should be provided.

When the server is installed, the apparatus copies the federation file, all object definition files, and all scripts from the map network drive or network share (that is, from the "trader") to the local subdirectories on the server. A "start service" is used to start or stop the servers in a federation.

Figure 10C:
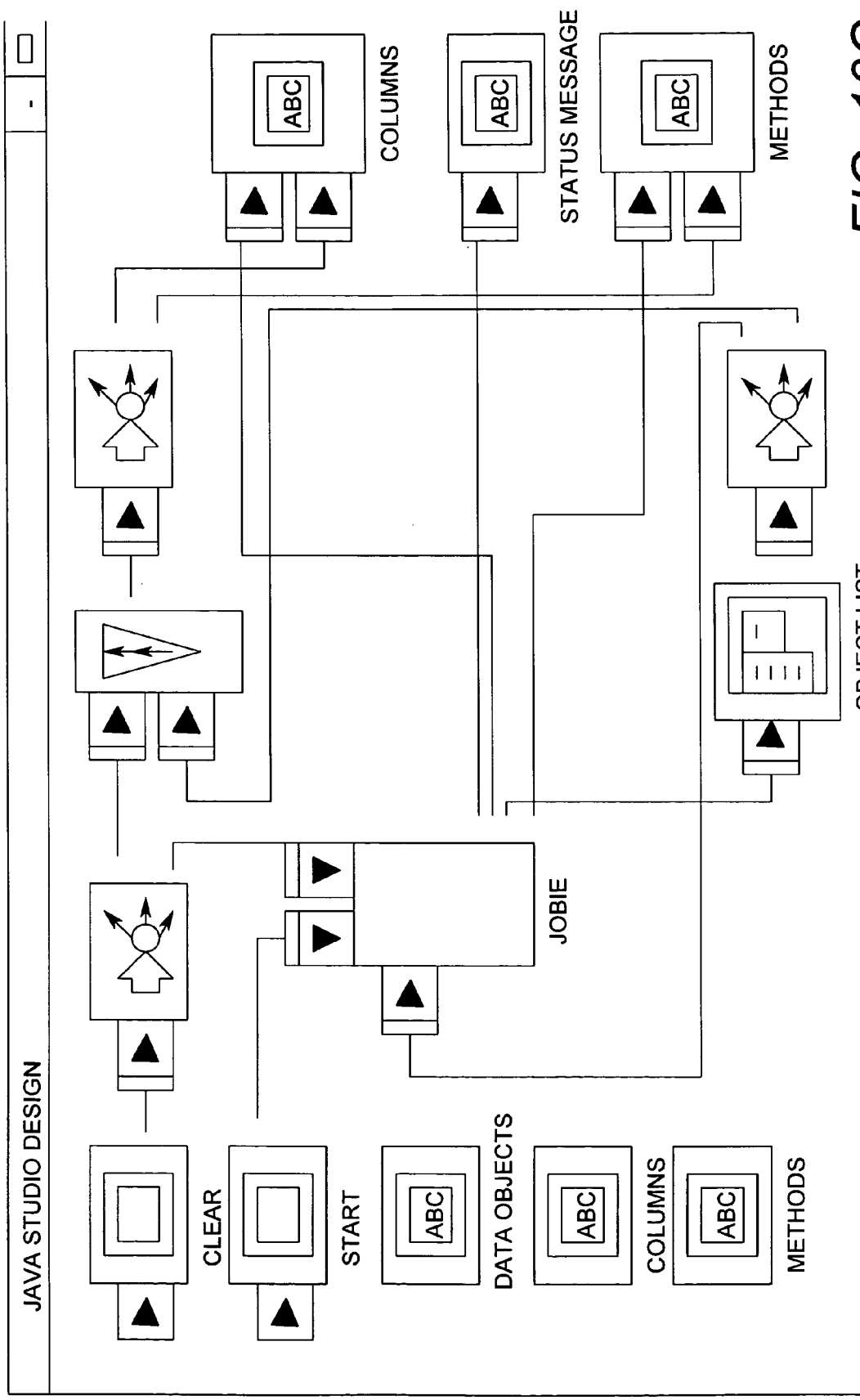
Figure 11D:
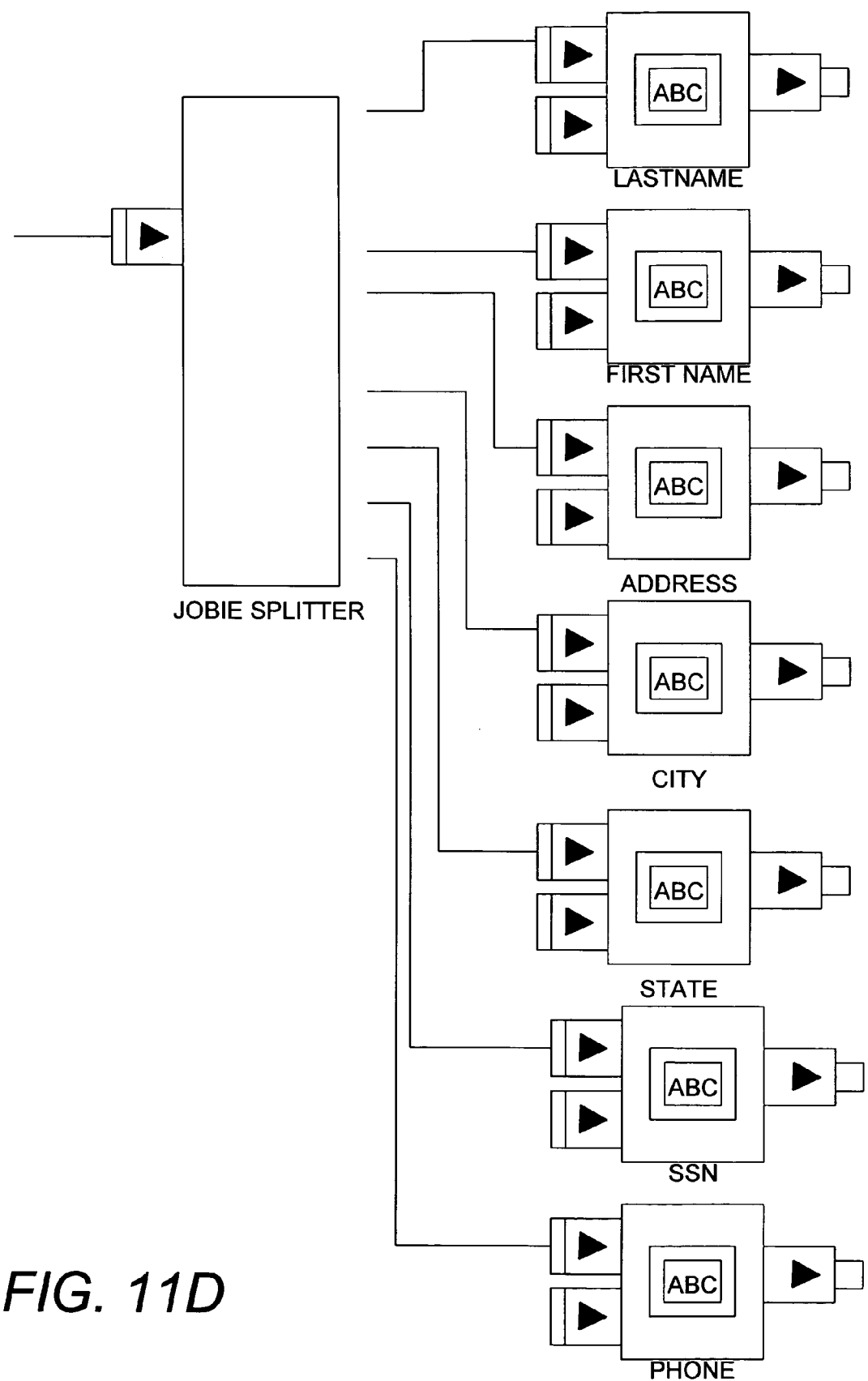

FIGS. 10A–10C illustrates an alternate user interface in the form of a Java Studio based integrated development environment in which the apparatus (messenger, agent, assistant) is invoked as a Java Bean. A version of the apparatus invokable as a Java Bean is provided so that, in this case, the apparatus appears to be a Java Bean and may be invoked by, or invoke, other Java Beans.

The Java Studio™ contains a design panel (bottom right in FIG. 10C) and a GUI panel (bottom left in FIG. 10B). It supplies a pallet of Java Beans. When a Java Bean is dropped on the design panel, if it has a corresponding GUI element (e.g., the Java Bean might contain a GUI text field), the latter will appear in the GUI panel (and may be moved, resized, etc.). When a bean is selected, there is the opportunity, via a dialogue box, to customize it. Thus, for example, a bean providing arithmetic functions might be customized with different operators, new expressions, etc., while GUI beans might be customized with respect to size, colors, background colors, fonts, etc., and other attributes.

Methods in the beans are exposed as connectors, so that the beans can be wired together visually. Components communicate by sending and receiving messages through the connectors. Messages may be a value (normal input, output); a trigger (e.g., a signal to start an action); . . .

Having created a design, one can generate an applet, standalone application, java bean, or "packaged design" (a single representation of the whole design, which may be used in future designs). (An enhancement to the integrated development environment might show, for example, the web page into which the new applet—if generation of an applet were selected—may be dropped.)

The GUI is active, so that, as the design is built, the resulting solution may also be tested. Key methods disclosed above (e.g., search, sort, . . . ) are made available as Java Beans or ActiveX components, and are usable independently. The apparatus itself is available as a Java Bean or ActiveX component, driven by a simple script, and may be used to create applications (business objects) of any degree of complexity. The apparatus supports the construction of full mission critical transaction or decision support solutions.

If the referenced data is distributed, the methods are invoked transparently, as parallel services—so that one may have transparent parallel data access and execution of methods across data distributed on the SMP nodes of a Unisys Cellular Multiprocessor, cluster, or network. The transparently accessed data may be heterogeneous: contained, for example, in NT files, SQL Server, Oracle, . . .

In the diagram of FIGS. 11A–11D, a search bean is shown driven by the indicated script. A "Personnel" database is imported, and is searched—with the command Personnel.search—for persons with a particular birthdate. If the "Personnel" database is distributed, the search methods will be run, automatically in parallel, across the distributed data. The search bean is easily customized by modifying the script. The example shows the supplied bean(s) being invoked by, and invoking, beans provided by Java Studio or by other bean "factories."

The considerable increase in performance of a system constructed according to the preferred embodiment may be illustrated in connection with an actual example concerning mining of the population of the United States. In this example, five million records, spread across 15 nodes, were searched, in serial, in 3 minutes, 27 seconds. Using a parallel search according to the preferred embodiment, the time was 17 seconds. If indices are built for the attributes of interest and searched in parallel, the search time is 4 seconds. If the indices are then cached, and the cached indices are searched in parallel, the search time is 1.2 seconds (some 172 times faster than the original serial search).

The times will often be linear, so that ten million records on 30 nodes, or 2,500,000 records on 8 nodes, will be searched in the same 1.2 seconds. The ability to search the population of the United States in less than 16 seconds portends a tremendous opportunity for completely new applications and solutions.

Another example of increased performance is a search of 15 million records across five nodes is illustrated in the following table:

|  |  | Serial | Parallel (preferred embodiment) | Improvement Times |
|---|---|---|---|---|
| NT file system | search | 6 min, 32 sec. | 1 min. 22 sec. | 4.44 |
|  | sort | 26 min, 26 sec. | 6 min., 8 sec. | 4.31 |
|  | indexed search |  | 3 sec. | 130 |
| SQL Server | search | 6 min., 11 sec. | 1 min., 20 sec. | 4.64 |
|  | sort | 2 hr., 38 sec. | 25 min., 20 sec. | 4.76 |
| Oracle | search | 14 min., 5 sec. | 3 min., 8 sec. | 4.49 |
|  | sort | 3 hrs., 17 min., 43 sec. | 36 min., 18 sec. | 5.45 |

In the above example, servers were installed on five Aquanta systems, connected to a PC client with 10T Ethernet. The installation of the servers transformed the environment into a cluster or multiprocessor federation. In this way, the servers may be used, for example, to support a virtual data warehouse (the data in which may reside in heterogeneous databases where a database need not scale beyond the largest server).

As noted above, the preferred embodiment employs a function shipping model. An alternative model is a data shipping model in which, rather than the functions being performed as close to the data as possible, and only the results (e.g., the number of "hits" in a search) being returned to the requester, the data to be searched is passed to the requester and the function is performed there. This involves the transfer of much more data about the network, and, even with very high network or backplane bandwidths, typically increases the latency of the operations. The implemented model also ensures that the latest version of the data in question never resides in a cache on a different node (thus eliminating cache coherency problems).

Certain design considerations may also be noted at this point. Critical in terms of scaling and performance are concurrency (the degree of parallelism), contention (the degree of serialization) and coherency (the cost of consistency). An aim is to minimize contention and the cost of consistency. While one cannot totally eliminate contention, it is found that by performing updates as close to the data as possible (treating that server as largely independent of the others), and by randomizing the distribution of data across the servers (e.g., using hashing techniques), the contention is usually low (shown in almost linear scaling).

The cost of coherency (not having a later update in someone else's cache) is a quadratic term, placing a maximum on the possible scaling as servers are added. By performing updates on the server containing the data, one ensures that there will never be later updates in the cache on other servers, ensuring cache coherency, and eliminating this cause of a maximum in the possible scaling.

Additionally, the preferred embodiments discussed above have employed the creation of data descriptor files from the metadata at run-time. In alternate embodiments, all files can be held in the repository, which is then accessed from each server at run-time or a distributed repository system may be used where lightweight versions of the repository reside on the local server nodes.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A computer implemented method of accessing and operating upon heterogeneous data at a plurality of nodes comprising the steps of:
    (1) propounding a request at a user site containing a data source object name wherein the heterogeneous data is treated as a single data source object, said request further containing at least a first method to be performed on the data source object and at least a second method to be performed on the results produced by performance of the first method;
    (2) determining at the user site whether the data source object is distributed across a plurality of nodes;
    (3) making a determination at the user site as to whether said second method should be performed on said results at each respective node or should be performed at the user site after said results are transmitted from each node back to the user site;
    (4) if said determining determines that the data source object is distributed, breaking the request into a plurality of new requests, each of the new requests including code having a format appropriate to a respective one of the nodes where the data source object resides, each new request including code representing said first method and also including code representing said second method if said making a determination has determined that said second method is to be executed at the respective node;
    (5) transmitting said new requests to said nodes;
    (6) executing the first method concurrently on the data source object at the corresponding nodes and storing the results thereof;
    (7) if said making a determination determined that said second method should be performed at a respective node, executing said second method on the results of executing said first method at that respective node and returning the resulting second method results to the user site;
    (8) if said making a determination determined that said second method should be performed at said user site for a respective node, returning the results of executing said first method at the respective node to the user site and executing said second method thereat; and
    (9) merging the results of executing said second method results at said user site.

2. The method of claim 1 wherein a first agent process at the user site performs the step of making a determination as to whether the second method should be performed at each respective node.

3. The method of claim 2 wherein, in performing the step of determining whether the data source object is distributed, the first agent process consults a data source descriptor file containing a subset of data contained in a first repository of metadata, and wherein, in performing the step of making a determination the first agent process accesses a table which indicates where the second method should be performed.

4. The method of claim 2 wherein at each node a remote agent process automatically executes said first method and returns the results to said user site, except where a new request contains a second method, in which case the remote agent process automatically executes said second method on the first method results and then automatically returns the resulting second method results to the user site.

5. The method of claim 2 wherein the results of execution of said second method are automatically merged by said first agent process, and wherein a third method is then automatically executed on the merged results by said first agent process.

6. The method of claim 5 wherein said first, second and third methods respectively comprise a search of the data object, a sort of the results of the search, and an e-mail of the merged results of the search.

7. The method of claim 5 wherein the data source descriptor file is created from the repository at run-time.

8. The method of claim 2 wherein a first messenger process cooperates with said first agent process to transmit each said new request to its respective node.

9. The method of claim 1, wherein said request is in the form of a script and each said new request is in the form of a script having a format appropriate to one of the respective nodes where the data source resides.

10. The method of claim 9 wherein said script and said new scripts are each in the form of a Java script.

11. The method of claim 10 wherein each of said nodes has associated therewith a respective database and a respective agent process, each respective agent process comprising code selected to execute the respective new script with respect to the data source object as it is contained in the respective database.

12. The method of claim 11 wherein each of said databases is different from the remaining respective databases.

13. The method of claim 12 wherein the respective databases comprise at least two databases, each selected from the following group:

Oracle database, NT database and SQL Server.

14. The method of claim 11 wherein each respective agent process accesses metadata located at the respective node in the course of executing the respective new script at that node.

15. The method of claim 14 wherein a data source descriptor file is created from the metadata at each respective node for use by the respective agent process.

16. The method of claim 14 wherein the metadata comprises a collection of data source objects which reflect treatment of data stored in each respective database as a single object and wherein each of said data source objects is broken down into successive class levels.

17. The method of claim 16 wherein said class levels include a class comprising a System Node, System Server, Data Source Object, Field Desc and System Script.

* * * * *